US007108801B2

(12) United States Patent
Wellinghoff et al.

(10) Patent No.: US 7,108,801 B2
(45) Date of Patent: Sep. 19, 2006

(54) METHODS AND BLENDS FOR CONTROLLING RHEOLOGY AND TRANSITION TEMPERATURE OF LIQUID CRYSTALS

(75) Inventors: Stephen T. Wellinghoff, San Antonio, TX (US); Douglas P. Hanson, San Antonio, TX (US)

(73) Assignee: Southwest Reasearch Institute, San Antonio, TX (US)

( * ) Notice: Subject to any disclaimer, the term of this patent is extended or adjusted under 35 U.S.C. 154(b) by 0 days.

(21) Appl. No.: 10/057,506

(22) Filed: Jan. 23, 2002

(65) Prior Publication Data

US 2003/0036609 A1 Feb. 20, 2003

Related U.S. Application Data

(60) Provisional application No. 60/263,387, filed on Jan. 23, 2001, provisional application No. 60/263,388, filed on Jan. 23, 2001, provisional application No. 60/263,392, filed on Jan. 23, 2001.

(51) Int. Cl.
C09K 19/52 (2006.01)
C09K 19/20 (2006.01)
C09K 19/38 (2006.01)
C08L 31/06 (2006.01)

(52) U.S. Cl. ............... 252/299.01; 252/299.67; 524/533; 524/559

(58) Field of Classification Search ........... 252/299.01, 252/299.64, 299.67, 299.65; 523/115–117; 524/533, 559
See application file for complete search history.

(56) References Cited

U.S. PATENT DOCUMENTS

| | | | |
|---|---|---|---|
| 4,099,856 A | 7/1978 | Weissflog et al. | |
| 4,201,856 A | 5/1980 | Jackson, Jr. | |
| 4,215,033 A | 7/1980 | Bowen | |
| 4,539,048 A | 9/1985 | Cohen | |
| RE32,073 E | 1/1986 | Randklev | |
| 4,588,756 A | 5/1986 | Bowen | |
| 4,623,738 A | 11/1986 | Sugerman et al. | |
| 4,659,751 A | 4/1987 | Bowen | |
| 4,663,147 A | 5/1987 | DePrince | |
| 4,753,652 A | 6/1988 | Langer et al. | |
| 4,914,221 A | 4/1990 | Winkler et al. | |
| 4,964,911 A | 10/1990 | Ibsen et al. | |
| 4,978,640 A | 12/1990 | Kelly | |
| 5,024,850 A * | 6/1991 | Broer et al. ............... 428/1.31 |
| 5,030,608 A | 7/1991 | Schubert et al. | |
| 5,057,018 A | 10/1991 | Bowen | |
| 5,064,877 A | 11/1991 | Nass et al. | |
| 5,073,294 A | 12/1991 | Shannon et al. | |
| 5,202,053 A | 4/1993 | Shannon et al. | |
| 5,276,068 A | 1/1994 | Waknine | |
| 5,308,886 A | 5/1994 | Masuhara et al. | |
| 5,328,947 A | 7/1994 | Taguchi et al. | |
| 5,334,625 A | 8/1994 | Ibsen et al. | |
| 5,372,796 A | 12/1994 | Wellinghoff | |
| 5,401,528 A | 3/1995 | Schmidt | |
| 5,472,797 A | 12/1995 | Yajima et al. | |
| 5,486,548 A | 1/1996 | Podszun et al. | |
| 5,502,087 A | 3/1996 | Tateosian et al. | |
| 5,556,931 A | 9/1996 | Imura et al. | |
| 5,563,230 A | 10/1996 | Hsu et al. | |
| 5,622,648 A | 4/1997 | Parri et al. | |
| 5,624,976 A | 4/1997 | Klee | |
| 5,654,471 A | 8/1997 | Zahn et al. | |
| 5,663,214 A | 9/1997 | Okada | |
| 5,670,583 A | 9/1997 | Wellinghoff | |
| 5,676,879 A * | 10/1997 | Heynderickx et al. ...... 252/299 |
| 5,695,681 A | 12/1997 | Siemensmeyer et al. | |
| 5,720,805 A | 2/1998 | Wellinghoff et al. | |
| 5,730,601 A | 3/1998 | Bowman et al. | |
| 5,804,097 A | 9/1998 | Delavier et al. | |
| 5,808,108 A | 9/1998 | Chappelow et al. | |
| 5,811,504 A | 9/1998 | Shiota et al. | |
| 5,833,880 A | 11/1998 | Siemensmeyer | |

(Continued)

FOREIGN PATENT DOCUMENTS

CA 2181507 1/1997

(Continued)

OTHER PUBLICATIONS

U.S. Appl. No. 09/667,370, filed Sep. 22, 2000, Wellinghoff et al.

(Continued)

Primary Examiner—Shean C Wu
(74) Attorney, Agent, or Firm—Paula Morris; Morris & Amatong, P.C.

(57) ABSTRACT

A method for producing a blend comprising randomly substituted mesogens comprising: providing one or more platform molecules have the following general structure:

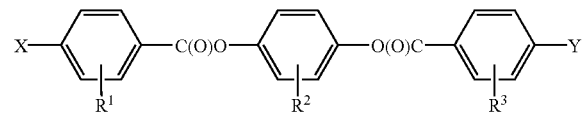

wherein at least one member selected from the group consisting of X and Y comprises one or more spacer groups; $R^2$ is a bulky organic group whereby, when both X and Y are reacted with polymerizable groups to produce polymerizable mesogens, $R^2$ provides sufficient steric hindrance to achieve a nematic state at room temperature while suppressing crystallinity of the polymerizable mesogens at room temperature; and, $R^1$ and $R^3$ are selected from groups less bulky than $R^2$; and independently substituting at least one member selected from the group consisting of X and Y with a polymerizable group, thereby producing a blend of randomly substituted mesogens.

44 Claims, No Drawings

U.S. PATENT DOCUMENTS

| | | | |
|---|---|---|---|
| 5,834,532 A | 11/1998 | Yamamoto et al. | |
| 5,852,248 A | 12/1998 | Chadwick | |
| 5,859,089 A | 1/1999 | Qian | |
| 5,865,623 A | 2/1999 | Suh | |
| 5,871,665 A | 2/1999 | Coates et al. | |
| 5,886,064 A | 3/1999 | Rheinberger et al. | |
| 5,897,885 A | 4/1999 | Petticrew | |
| 5,910,273 A | 6/1999 | Thiel et al. | |
| 5,911,911 A | 6/1999 | Keller et al. | |
| 5,955,514 A | 9/1999 | Huang et al. | |
| 5,989,461 A * | 11/1999 | Coates et al. | 252/585 |
| 5,998,499 A | 12/1999 | Klee et al. | |
| 6,022,404 A | 2/2000 | Ettlinger et al. | |
| 6,027,816 A | 2/2000 | Ono et al. | |
| 6,031,015 A | 2/2000 | Ritter et al. | |
| 6,060,042 A | 5/2000 | Schuhmacher | |
| 6,087,816 A | 7/2000 | Volk | |
| 6,090,308 A | 7/2000 | Coates et al. | |
| 6,117,920 A * | 9/2000 | Jolliffe et al. | 522/170 |
| 6,136,225 A | 10/2000 | Meyer et al. | |
| 6,144,428 A * | 11/2000 | Schadt et al. | 349/113 |
| 6,194,481 B1 | 2/2001 | Furman | |
| 6,204,302 B1 | 3/2001 | Rawls et al. | |
| 6,217,792 B1 * | 4/2001 | Parri et al. | 252/299.61 |
| 6,217,955 B1 * | 4/2001 | Coates et al. | 428/1.31 |
| 6,258,974 B1 | 7/2001 | Wellinghoff et al. | |
| 6,291,035 B1 * | 9/2001 | Verrall et al. | 428/1.3 |
| 6,303,050 B1 | 10/2001 | Dannenhauer et al. | |
| 6,335,462 B1 | 1/2002 | Etzbach et al. | |
| 6,410,765 B1 | 6/2002 | Wellinghoff | |
| 6,414,092 B1 * | 7/2002 | Coates et al. | 526/63 |
| 6,417,244 B1 | 7/2002 | Wellinghoff | |
| 6,649,230 B1 * | 11/2003 | Seiberle et al. | 428/1.2 |
| 6,695,617 B1 | 2/2004 | Wellinghoff | |
| 6,696,585 B1 | 2/2004 | Wellinghoff | |
| 6,699,405 B1 | 3/2004 | Prechtl et al. | |
| 6,743,936 B1 | 6/2004 | Wellinghoff | |
| 2002/0013382 A1 | 1/2002 | Furman | |
| 2002/0036285 A1 | 3/2002 | Prechtl et al. | |
| 2002/0177727 A1 | 11/2002 | Wellinghoff | |
| 2003/0036609 A1 | 2/2003 | Wellinghoff | |
| 2003/0055280 A1 | 3/2003 | Wellinghoff | |
| 2003/0125435 A1 | 7/2003 | Norling | |
| 2003/0168633 A1 | 9/2003 | Wellinghoff | |
| 2004/0144954 A1 | 7/2004 | Wellinghoff | |
| 2004/0199004 A1 | 10/2004 | Wellinghoff et al. | |

FOREIGN PATENT DOCUMENTS

| | | |
|---|---|---|
| EP | 0159887 A2 | 10/1985 |
| EP | 0 242 278 A2 | 10/1987 |
| EP | 0722992 A1 | 7/1996 |
| EP | 0754 675 A2 | 1/1997 |
| EP | 0 869 112 A1 | 3/1998 |
| EP | 1142863 A2 | 10/2001 |
| GB | 2 297 549 A | 7/1996 |
| GB | 2330139 A | 4/1999 |
| JP | H 5-17894 | 12/1991 |
| JP | 08-157597 | 6/1996 |
| WO | WO 79/01040 | 11/1979 |
| WO | WO 93/22397 | 11/1993 |
| WO | WO 94/16129 | 7/1994 |
| WO | WO 94/24052 | 10/1994 |
| WO | WO 92/16183 | 4/1997 |
| WO | WO 97/14674 | 4/1997 |
| WO | WO 9714674 | 4/1997 |
| WO | WO 98/13008 | 4/1998 |
| WO | WO 98/23580 | 6/1998 |
| WO | WO 99/17716 | 4/1999 |
| WO | WO 02/070543 2 | 9/2002 |

OTHER PUBLICATIONS

U.S. Appl. No. 09/692,690, filed Oct. 19, 2000, Wellinghoff.
U.S. Appl. No. 09/690,527, filed Oct. 17, 2002, Wellinghoff et al.
U.S. Appl. No. 09/691,680, filed Oct. 18, 2000, Wellinghoff.
U.S. Appl. No. 09/687,447, filed Oct. 13, 2000, Wellinhhoff.
U.S. Appl. No. 09/314,350, filed May 19, 1999, Furman et al.
U.S. Appl. No. 09/726,769, filed Nov. 29, 2000, Furman et al.
U.S. Appl. No. 60/263,387, filed Jan. 23, 2001, Wellinghoff et al.
U.S. Appl. No. 10/057,548, filed Jan. 23, 2002, Wellinghoff et al.
U.S. Appl. No. 60/263,388, filed Jan. 23, 2001, Wellinghoff et al.
U.S. Appl. No. 60/263,392, filed Jan. 23, 2001, Wellinghoff.
U.S. Appl. No. 60/303,986, filed Jul. 9, 2001, Wellinghoff.
U.S. Appl. No. 10/056,121, filed Jan. 23, 2002, Wellinghoff et al.
U.S. Appl. No. 10/190,470, filed Jul. 5, 2002, Wellinghoff et al.
H. Schmidt et al., "Organically modified ceramics and their applications", Journal of Non-Crystalline Solids, 1990, 121, pp. 428-435.
Mark W. Ellsworth et al., "Mutually Interpenetrating Inorganic-Organic Networks. New Routes into Nonshrinking Sol-Gel Composite Materials", J. Am Chem. Soc., 1991, 113, 2756-2758.
Stephen Wellinghoff et al., "Tantalum oxide-polymer composites", The International Symposium on Advances in So.-Gel Process and Applications, Edited by Y.A. Attia, Plenum Press, pp. 141-154, 1994.
Christine Landry et al., "In situ polymerization fo tetraethoxysilane in poly(methyl methacrylate): morphology and dynamic mechanical properties", POLYMER, 1992, vol. 33, No. 7, pp. 1486-1495.
Wolfgang Wedler et al., "Vitrification in Low-molecular-weight mesogenic Compounds", J. Mater. Chem., 1991, 1(3), 347-356.
Sukmin Lee et al., "Phase Behavior of Liquid Crystalline Polymer/Model Compound Mixtures: Theory and Equipment", Macromolecules, vol. 27, No. 14, 1994, 3955-3962.
R.A.M. Hikmet et al., "Effect of the Orientation of the Ester Bonds on the Properties of Three Isomeric Liquid Crystal Diacrylates Before and After Polymerization", Macromolecules, vol. 28, No. 9, 1995, 3313-3327.
Y. Wei et al., "Synthesis of New Organic-Inorganic Hybrid Glasses"; Chem. Mater. 2(4), 337 (1990).
Manabu Node et al. "Hard Acid and Soft Nucleophile System. 2[1] Demethylation of Methyl Ethers of Alcohol and Phenol with an Aluminum Halide-Thiol System", J. Org. Chem. 1980, 45, 4275-4277 (1980 American Chemical Society).
Glancarto Galli et al., "Thermotropic poly(ester-β-sulfides)s", Polymer Bulletin 21, 563-569 (1989).
Gerold Shcmitt, et al., New liquid crystalline dl- and tetra-acrylates for network formation Liquid Crystals, 2001, vol. 28, No. 11, 1611-1621.
Mindy N. Rittner, Nanostructured Materials: A Technical-Market Analysis, Proceedings of The First BCC Conference on Fine, Ultrafine, and Nano Particles, 1998, Ch, 1. p. 1. Business Communications Co., Inc., USA.
Michael J S. Dewar and Robert M. Riddle, Factors Influencing the Stabilities of Nematic Liquid Crystals, Journal of the American Chemical Society, Nov. 12, 1975, 97:23.
Choi, Rheological studies on sterically stabilized model dispersions of uniform colloidal spheres. II. Steady-shear viscosity, J. Colloid Interface Science., Sep. 1986, pp. 101-113, vol. 113(1), Academic Press, Inc.
Condon, Reduction of composite contraction stress through non-bonded microfiller particles, Dental Materials, Jul. 1998, pp. 256-260, vol. 14.
Hellwig, Influence of an incremental application technique on the polymerization of two light-activated dental composite filling materials, Dtsch. Zahnaerztl Z., 1991, pp. 270-273, vol. 46.
Hikmet, Anisotropic polymerization shrinkage behavior of liquid-crystalline diacrylates, Polymer, 1992, pp. 89-95, vol. 33(1), Butterworth-Heinemann Ltd.
Lee, Phase Behavior of Liquid Crystalline Polymer/Model Compound Mixtures: Theory and Experiment, Macromolecules, 1994, pp. 3955-3962, vol. 27.

Liu, Constant-volume polymerization of composites by addition of ammonia-modified montmorillonite, American Journal of Dentistry, Apr. 1990, pp. 44-50, vol. 3(2).

Millich, Elements of light-cured epoxy based dental polymer systems, J. Dent. Res., Apr. 1998, pp. 603-608, vol. 77(4).

Rawls et al, Low Shrinkage resins from liquid crystal diacrylate monomers, ACS Polymer Preprints, Sep. 1997, pp. 167-168, vol. 38(2).

Stansbury et al, Cyclopolymerizable Monomers for use in dental resin composites, J. Dent. Res., Mar. 1990, pp. 844-848, vol. 69(3).

Uno et al, Marginal adaptation of a restorative resin polymerized at reduced rate, Scand. J. Dent. Res., 1991, pp. 440-444, vol. 99(5).

Holmberg, Ester Synthesis with Dicyclohexycarbodiimide Improved by Acid Catalysts, Acta Chemica Scandinavica, 1979, pp. 410-412, vol. B 33.

Nakamura, Characterization of Epitaxially Grown ZnS : Mn Films on a GaAs(100) Substrate prepared by the Hot-wall Epitaxy Technique, J. Mater. Chem., 1991, pp. 357-359, vol. 1(3).

Schultz, Polymerization and Viscoelastic Behavior of Networks from a Dual-Curing, Liquid Crystalline Monomer, J. Polym. Phys., 1999, pp. 1183-1190, vol. 37, John Wiley & Sons, Inc.

Griffin, Mesogenic Polymers. III. Thermal Properties and Synthesis of Three Homologous Series of Thermotropic Liquid Crystalline "Backbone" Polyesters, Journal of Polymer Science: Polymer Physics Edition, 1981, pp. 951-969, vol. 19, John Wiley & Sons, Inc.

Hutchins, Aqueous Polar Aprotic Solvents. Efficient Sources of Nucleophilic Oxygen, J. Org. Chem. 1983, pp. 1360-1362, vol. 48, The American Chemical Society.

Kornblum, Displacement of the Nitro Group of Substituted Nitrobenzenes—a Synthetically Useful Process, J. Org. Chem., 1976, pp. 1560-1564, vol. 41, The American Chemical Society.

Clark, X-Ray Scattering Study of Smectic Ordering in a Silica Aerogel, Physical Review Letters, Nov. 22, 1993, pp 3505-3508, vol. 71, No. 21, The American Chemical Society.

Broer, In-Situ photopolymerization of oriented liquid-crystalline acrylates, 4 Influence of a lateral methyl substituent on monomer and oriented polymer network properties of a mesogenic diacrylate, Makromol. Chem. 1989, pp. 3201-3215, vol. 190, Huthig & Wepf Verlag Basel, Heidelberg, New York.

Barclay, Liquid Crystalline and Rigid-rod Networks, Prog. Polym. Sci., 1993, pp. 899-945, vol. 18(5); Pergamon Press Ltd.

Liquid Crystalline Polymers to Mining Applications, Encyclopedia of Polymer Science and Engineering, 1987, pp. 1-61, vol. 9, John Wiley & Sons, New York.

Wei, Synthesis of New Organic-Inorganic Hybrid Glasses, Chemistry of Materials, Jul./Aug. 1990, pp. 337-339, vol. 2 (4), The American Chemical Society.

Meek, Inertness of Tetrachlorofulvenes in the Diels-Alder Reaction, J. Org. Chem., Jan. 9, 1958, pp. 1708-1710, vol. 22 (12), The American Chemical Society.

Suzuki et al, Preparation of poly(dimethylsiloxane) macromonomers by the initiator method: 2. Polymerization mechanism, Polymer, 1989, pp. 333-337, vol. 30(2), Butterworth & Co. (Publishers) Ltd.

Kochan et al, Solid Freeform Manufacturing—Assessments and Improvements at the Entire Process Chain, Proceedings of the Seventh International Conference on Rapid Prototyping, Mar. 31-Apr. 3, 1997, pp. 203-214, 94RA021.

Norling et al, Cure shrinkage of experimental LC monomer based composite resins, Abstract, American Association for Dental Research meeting, 2001, Chicago, IL.

Mogri et al, Thermomechanical of liquid crystalline monomer in dental composites, Abstract, American Association for Dental Research meeting, 2001, Chicago, IL.

Dowell et al, The Effect of Silanation on Polymerization and Dynamic Mechanical Behavior of a homogenous nanofilled resin, Abstract, American Association for Dental Research meeting, 2001, Chicago, IL.

Logan et al, Effect of Silanation on Mechanical Properties of Homogeneous Nanofilled resins, Abstract, American Association for Dental Research meeting, 2001, Chicago, IL.

Norling et al, Synthesis of a new low shrinkage liquid crystal monomer, Abstract, American Association for Dental Research meeting, 2000, Washington, D.C.

Furman et al, A Radiopaque Zirconia Microfiller for Translucent Composite Restoratives, Abstract, American Association for Dental Research meeting, 2000, Washington, D.C.

Norling et al, Polymerizable nematic liquid crystal monomers for reduced shrinkage restorative resins, Proc.17th Southern Biomed. Eng. Conf., 1998, p. 120

Geng, Targeted Drug Release by a Novel Polymeric Device Based on EVA (Ethylene Vinyl Acetate) For Periodontal Condition, (ABSTRACT).

Boland et al, Cell Survival and Cytokine Expression by Dental Cells Treated with a Liquid Crystal Resin Monomer,J. Dent. Res., 2001, pp. 151 (Abstract 928), vol. 80.

Wang, Rheological Properties of Dental Composites, (ABSTRACT).

Wellinghoff et al, Reduced Shrinkage dimethacrylate liquid crystal resins, J. Den. Res. 1997, pp. 279 (Abstract 2127), vol. 76.

Norling et al, Cure shrinkage of composite resins and an experimental LC monomer, J. Dent. Res., 1999, pp. 233 (Abstract 1020), vol. 78.

Panyayong, Effects of Corn-Starched & Primer Additions on Mechanical Properties of Provisional Dental Resin, (ABSTRACT).

Hellwig et al, Effect of the Layer Technique of the Polymerization of Two Light-Activated Composite Filling Materials, Dtsch. Zahnaerztl Z., 1991, pp. 270-273, vol. 46.

Bigg, et al.: "The Effect of Monomer Structure on the Adhesive Properties of Thermally Reversible Isocyanate Polymers"; ANTEC 2000: Conference Proceedings vol. 1—Processing; May 7, 2000-May 11, 2000; pp. 1228-1231; 58th, vol. 1; Society of Plastics Engineers, USA.

Wang, et al.; "Synthesis and Properties of Phosphorus Containing Polyester-Amides Derived from 1,4-Bis(3-aminobenzoyloxy)-2-(6-oxido-6H-dibenz<c,e><1,2>oxaphosphorin-6-yl) Phenylene"; Journal of Polymer Science: Part A: Polymer Chemistry; (1999); pp. 891-899; vol. 37; John Wiley & Sons, Inc., USA.

Kim, et al.; "Effects of Annealing on the Structure Formation in the Bulk State of Thermotropic Liquid Crystalline Polyesteramides with Bulky Side Groups"; Eur. Polym. J.; (1995) pp. 505-512; vol. 31, No, 6; Elsevier Science Ltd., UK.

Aharoni; "Dilute and Concentrated Solution Properties of Zigzag Polymers Comprising Long Rodlike Segments with Freely Rotating Joints"; Macromolecules; (1987); pp. 877-884; vol. 20, No. 4; American Chemical Society, USA.

Wan, et al.; "Relationship Between Chemical Structure and Properties for Mesogen-Jacketed Liquid Crystal Polymers"; Gaodeng Xuexiao Huaxue Xuebao; (1998); pp. 1507-1512; vol. 19, No, 9; Gaodeng Jiaoyu Chubanshe, CN; Abstract Only.

* cited by examiner

METHODS AND BLENDS FOR CONTROLLING RHEOLOGY AND TRANSITION TEMPERATURE OF LIQUID CRYSTALS

PRIORITY DATA

The present application claims the benefit of the following provisional applications, all filed Jan. 23, 2001: Ser. No. 60/263,387; Ser. No. 60/263,392; Ser. No. 60/263,388.

GOVERNMENT RIGHTS CLAUSE

The U.S. government has certain rights in this invention pursuant to grant number NIDCR 1 P01 DE11688.

FIELD OF THE INVENTION

The application provides novel methods and blends for controlling rheology and transition temperature of photocurable mesogens while maintaining low polymerization shrinkage, without adversely affecting mechanical strength and stability of the cured resins.

BACKGROUND OF THE INVENTION

Photocurable resins which are transparent or translucent, radioopaque, have good workability, and have good mechanical strength and stability are useful in medical, dental, adhesive, and stereolithographic applications.

Low polymerization shrinkage is an important property for such resins. In dental applications, the phrase "zero polymerization shrinkage" typically means that the stresses accumulated during curing do not debond the dentin-restorative interface or fracture the tooth or restorative, which can result in marginal leakage and microbial attack of the tooth. Low polymerization shrinkage also is important to achieve accurate reproduction of photolithographic imprints and in producing optical elements.

Another advantageous property for such resins is maintenance of a liquid crystalline state during processing. For comfort in dental applications, the resin should be curable at "room temperature," defined herein as at typical ambient temperatures up to about body temperature. Preferred curing temperatures are from about 20° C. to about 37° C. Mesogens which have been found to polymerize in a relatively stable manner at such temperatures are bis 1,4 [4'-(6'-methacryloxyhexyloxy)benzoyloxy] t-buylphenylene mesogens and their structural derivatives. These mesogens have the following general structure:

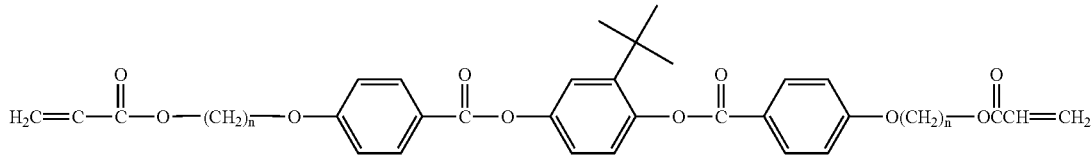

Methods for varying the rheology and phase transition temperature of the mesogens, without adversely affecting the mechanical strength and stability of the cured mesogenic resin, are always needed.

SUMMARY OF THE INVENTION

A method is provided for producing a blend comprising randomly substituted mesogens, said method comprising:

providing one or more platform molecules comprising terminal substituents X and Y; and independently substituting a polymerizable group for at least one member selected from the group consisting of X and Y, thereby producing a blend of randomly substituted mesogens;

wherein said platform molecules have the following general structure:

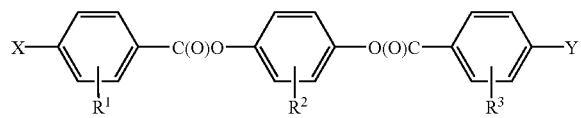

wherein X and Y are the same or different terminal functionalities;

$R^2$ is a bulky organic group whereby, when both X and Y are reacted with polymerizable groups to produce polymerizable mesogens, $R^2$ provides sufficient steric hindrance to achieve a nematic state at room temperature while suppressing crystallinity of said polymerizable mesogens at room temperature;

$R^1$ and $R^3$ are selected from groups less bulky than $R^2$;

Also provided is a method comprising:

mixing a primary polymerizable mesogen comprising a primary nematic to isotropic transition temperature ($T_{n->isotropic}$) with an amount of a secondary polymerizable mesogen comprising a secondary $T_{n->isotropic}$, greater than said primary $T_{n->isotropic}$ to produce a mixture having a curing temperature ($T_c$) sufficiently low to avoid discomfort during dental procedures;

wherein said amount of said secondary polymerizable mesogen is effective to increase said mixture $T_{n->isotropic}$ to a temperature greater than said primary $T_{n->isotropic}$ and to maintain a sufficient difference ($\Delta T$) between $T_c$ and said mixture $T_{n->isotropic}$ to produce a polymerization shrinkage of about 3 vol % change or less.

Also provided are compositions made by such methods.

DETAILED DESCRIPTION OF THE INVENTION

Novel methods and blends are provided for controlling rheology and transition temperature of polymerizable mesogens without adversely affecting mechanical strength and stability of the polymerized product.

While it is desirable to maintain a low curing temperature for polymerizable mesogens in certain applications, the problem of polymerization shrinkage increases if the curing temperature ($T_c$) and the $T_{n->isotropic}$ are too close. As the difference (ΔT) between this two parameters decreases, the amount of polymerization shrinkage tens to increase. Methods are needed for suppressing $T_c$, preferably to "room temperature," most preferably to from about 20° C. to about 37° C., and for increasing $T_{n \to isotropic}$ as much as possible without promoting crystallization, thereby maintaining a sufficient ΔT to produce "low polymerization shrinkage," hereinafter defined as about a 3 vol. % change or less, preferably at a 2 vol. % change or less, without adversely affecting physical properties of the cured product.

The present application provides such methods and compositions derived from either "random end substitution" or "diluent blending" of the polymerizable mesogens.

The Mesogens

The mesogens are molecules having the following general structure:

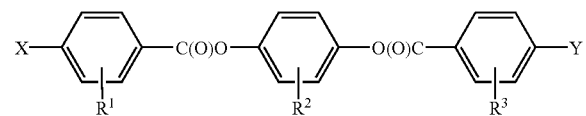

wherein X and Y are selected from the group consisting of terminal functionalities and polymerizable groups. In platform molecules, X and Y are terminal functionalities. In polymerizable mesogens, X and/or Y are polymerizable groups. Terminal functionalities and polymerizable groups are further defined below; and, $R^2$ is a desired substituent, preferably a "bulky organic group," defined herein as an organic group having a bulk greater than $R_1$ and $R_3$, said bulk being adapted to provide sufficient steric hindrance to achieve a nematic state at room temperature while suppressing crystallinity of liquid crystal monomers made using the mesogens at room temperature. The result is more effective rheology and workability at room temperature. Suitable $R^2$ groups generate asymmetry in the packing of the molecules, and include, but are not necessarily limited to alkyl groups having from about 1 to 6 carbon atoms and aryl groups. Preferred $R^2$ groups include, but are not limited to alkyl groups having from about 1 to about 4 carbon atoms and phenyl groups. More preferred $R^2$ groups are methyl groups, t-butyl groups, isopropyl groups, secondary butyl groups, and phenyl groups. Most preferred $R^2$ groups are methyl groups and t-butyl groups; and $R^1$ and $R^3$ are selected from groups less bulky than $R^2$, preferably selected from the group consisting of hydrogen atoms and methyl groups.

As used herein, the phrase "terminal functionalities" refers to X and Y where the referenced molecules are platform molecules. "Terminal functionalities" are defined as protective groups and precursors to polymerizable groups, which generally comprise functionalities that readily react with "polymerizable groups" to form reactive ends. Suitable terminal functionalities independently are selected from the group consisting of hydroxyl groups, amino groups, sulfhydryl groups, halogen atoms, and "spacer groups", defined herein as selected from the group consisting of H—$(CH_2)_n$—O— groups, Cl$(CH_2)_n$—O— groups, Br$(CH_2)_n$—O— groups, I$(CH_2)_n$—O—, wherein n is from about 2 to about 12, preferably from about 2 to about 9, more preferably from about 2 to about 6, and most preferably 6, and the $CH_2$ groups independently can be substituted by oxygen, sulfur, or an ester group; provided that at least 2 carbon atoms separate said oxygen or said ester group. Most preferred terminal functionalities are hydroxyl groups.

Where the mesogen is a polymerizable mesogen, X and/or Y are "polymerizable groups," defined as groups that may be polymerized by nucleophilic addition, free radical polymerization, or a combination thereof. Preferred polymerizable groups are polymerizable by Michael addition. Michael addition requires the addition of a nucleophile and an electron deficient alkene. Groups suitable for polymerization by Michael addition include but are not necessarily limited to the examples found in A. Michael, *J. Prakt. Chem.* [2] 35, 349 (1887); R. Connor and W. R. McClelland, *J. Org. Chem.*, 3, 570 (1938); and C. R. Hauser, M. T. Tetenbaum, *J. Org. Chem.*, 23, 1146 (1959), all of which are incorporated by reference herein.

Examples of suitable polymerizable groups include, but are not necessarily limited to substituted and unsubstituted alkenyl ester groups comprising a polymerizable unsaturated carbon-carbon bond, wherein said alkenyl group has from about 2 to about 12 carbon atoms, preferably from about 2 to about 9 carbon atoms, more preferably from about 2 to about 6 carbon atoms. In one embodiment, said substituted alkenyl ester groups comprise at least one halogen atom selected from the group consisting of chorine atoms, bromine atoms, and iodine atoms. Preferred alkenyl esters are acryloyloxy alkoxy groups and methacryloyloxy alkoxy groups. More preferred polymerizable groups include, but are not necessarily limited to cinnamoyloxy groups, acryloyloxy groups, methacryloyloxy groups comprising an alkyl moiety having from about 2 to about 12 carbon atoms, preferably about 6 carbon atoms, thiolalkyloxy groups comprising an alkyl moiety having from about 2 to about 12 carbon atoms, preferably about 6 carbon atoms, said alkyl moiety comprising $CH_2$ groups which independently can be substituted by oxygen, sulfur, or an ester group; provided that at least 2 carbon atoms separate said oxygen or said ester group. Because assymetry suppresses crystallinity while maintaining a nematic state, it is preferred for X and Y to be different groups.

Preferred polymerizable mesogens include, but are not necessarily limited to bis-acryloyloxy alkyloxy and bis-methacryloyloxy alkyloxy polymerizable mesogens. Most preferred polymerizable mesogens are bis 1,4 [4'-(6'-(R,$R^4$)-oxy-A-oxy)benzoyloxy] $R^2$-phenylene mesogens. These mesogens have the following general structure:

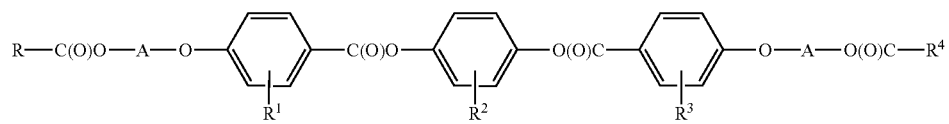

This structure is similar to the structure of the platform molecules except that X and Y are replaced by polymerizable groups wherein:

A is selected from the group consisting of alkyl groups and methyl-substituted alkyl groups having from about 2 to about 12 carbon atoms, preferably having from about 2 to about 9 carbon atoms, more preferably having from about 2 to about 6 carbon atoms, and most preferably having about 6 carbon atoms; and R and $R^4$ are polymerizable groups, including but not necessarily limited to nucleophiles and groups comprising at least one electron deficient alkene. Suitable nucleophiles include, but are not necessarily limited to ester groups, organic acid groups, amine groups, hydroxyl groups, and sulfhydryl groups. More preferred polymerizable groups comprise electron deficient alkenes. Suitable electron deficient alkenes independently are selected from the group consisting of substituted and unsubstituted alkenyl ester groups comprising a polymerizable unsaturated carbon-carbon bond, wherein said alkenyl group has from about 2 to about 12 carbon atoms. In one embodiment, said substituted alkenyl ester groups comprise a halogen atom selected from the group consisting of chorine atoms, bromine atoms, and iodine atoms. Preferred alkenyl esters are acryloyl groups and methacryloyl groups. Again, because assymetry suppresses crystallinity while maintaining a nematic state, it is preferred for X and Y to be different groups. One end of a polymerizable mesogen also may comprise a bridging agent, in which case $R^2$ may also be hydrogen or group less bulky than a methyl group, due to the inherent assymmetry of the dimer molecule. Dimers are discussed more fully below.

In a preferred embodiment, $R^2$ is selected from the group consisting of a methyl group and a t-butyl group, A is a hexyl group, and one of R and $R^4$ is selected from the group consisting of an acryloyl group and a methacryloyl group.

In a preferred embodiment, a proportion of X and/or Y (or R and/or $R^4$) comprises a crystallization retardant. A "crystallization retardant" is defined as a substituent that retards crystallization of the monomers without suppressing the $T_{n \to isotropic}$ (the nematic to isotropic transition temperature). The proportion of X and/or Y (or R and/or $R^4$) that comprises a crystallization retardant preferably is sufficient to suppress crystallinity of the mesogenic material, particularly at room temperature for dental applications, and to maintain flowability of the mesogenic material under the particular processing conditions. Suitable crystallization retardants include, but are not necessarily limited to halogen atoms. Exemplary halogen atoms are chlorine, bromine, and iodine, preferably chlorine. Typically, the proportion of the crystallization retardant required is about 3–50 mole %, more preferably 10–15 mole %, and most preferably about 14 mole % or less.

Methods for Making the Mesogens

The mesogens may be made using any suitable method. In the past, polymerizable mesogens having the foregoing structure were synthesized by a multistep process ("Scheme 1"), as shown below:

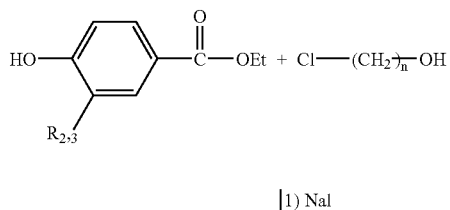

Acetone | 1) NaI
        | 2) KOH
        | 3) HCl

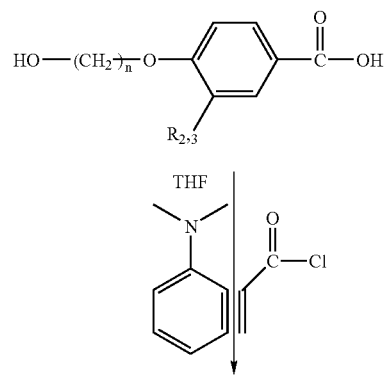

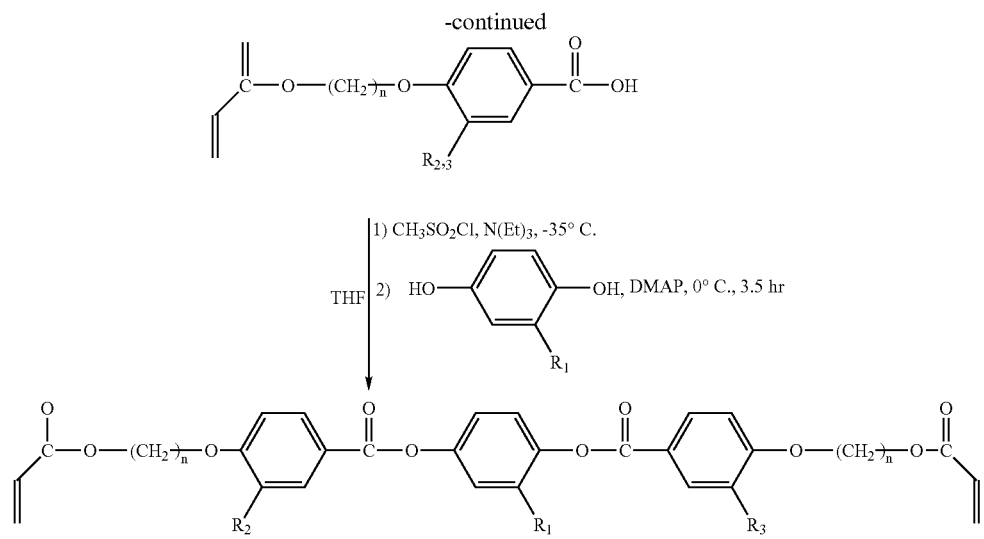

In Scheme 1, molecular ends containing the outer aromatic groups and the alkyl groups were produced first and then coupled to the central aromatic group by diaryl ester bonds. Specifically, the alkali phenoxide salt of p-hydroxybenzoic acid-ethyl ester nucleophile attacked the 6-hydroxy 1-chloro hexane with the aid of iodide catalyst to produce the 6-hydroxyhexyloxybenzoic acid (after hydrolysis of the ethyl ester) by a procedure that yielded at best 70% product. Although rather straightforward, the commercial potential of this synthesis has been limited by the use of the 6-hydroxy 1-chlorohexane. The reaction is run in acetone over several days and requires significant workup. The reaction also produces only about a 40% overall yield, at best, and requires column separation to separate monosubstituted from disubstituted material.

Platform molecules also may be made using synthetic pathways that use relatively low cost materials to synthesize a central aromatic component comprising end groups that are easily reacted with the desired polymerizable groups. The methods, herein called "Scheme 2," are quantitative, produce high yields, the products are easily purified (preferably by crystallization), and many of the products are more stable than bisalkenes, which must be stabilized against polymerization.

In another method, reactive groups on a phenylene ring at para-positions (preferably hydroxyl groups) form ester linkages with one of two reactive groups in para-positions on two other phenylene rings. The result is three-ring platform molecules having terminal functionalities. One or both of the terminal functionalities may be coupled with (a) other terminal functionalities to produce other platform molecules, or (b) polymerizable groups, preferably a nucleophile and/or an electron deficient alkene-containing group, to produce polymerizable mesogens.

Preparation of Molecular Ends and Coupling to Central Aromatic Group

In a first embodiment (Scheme 2), the molecular ends of the mesogen (outer aromatic and alkyl groups) are prepared and coupled to the central aromatic group by diaryl ester bonds. This synthetic pathway is illustrated and described in detail below:

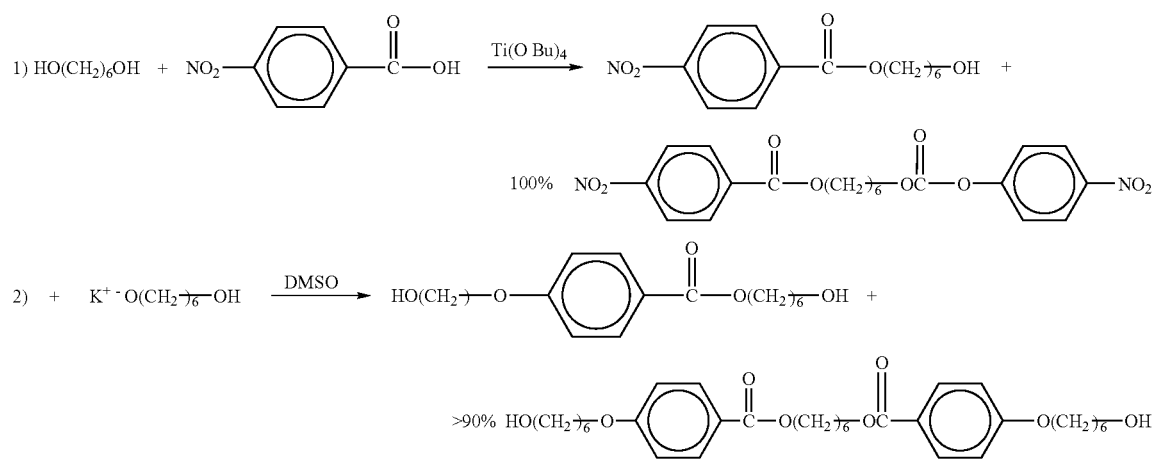

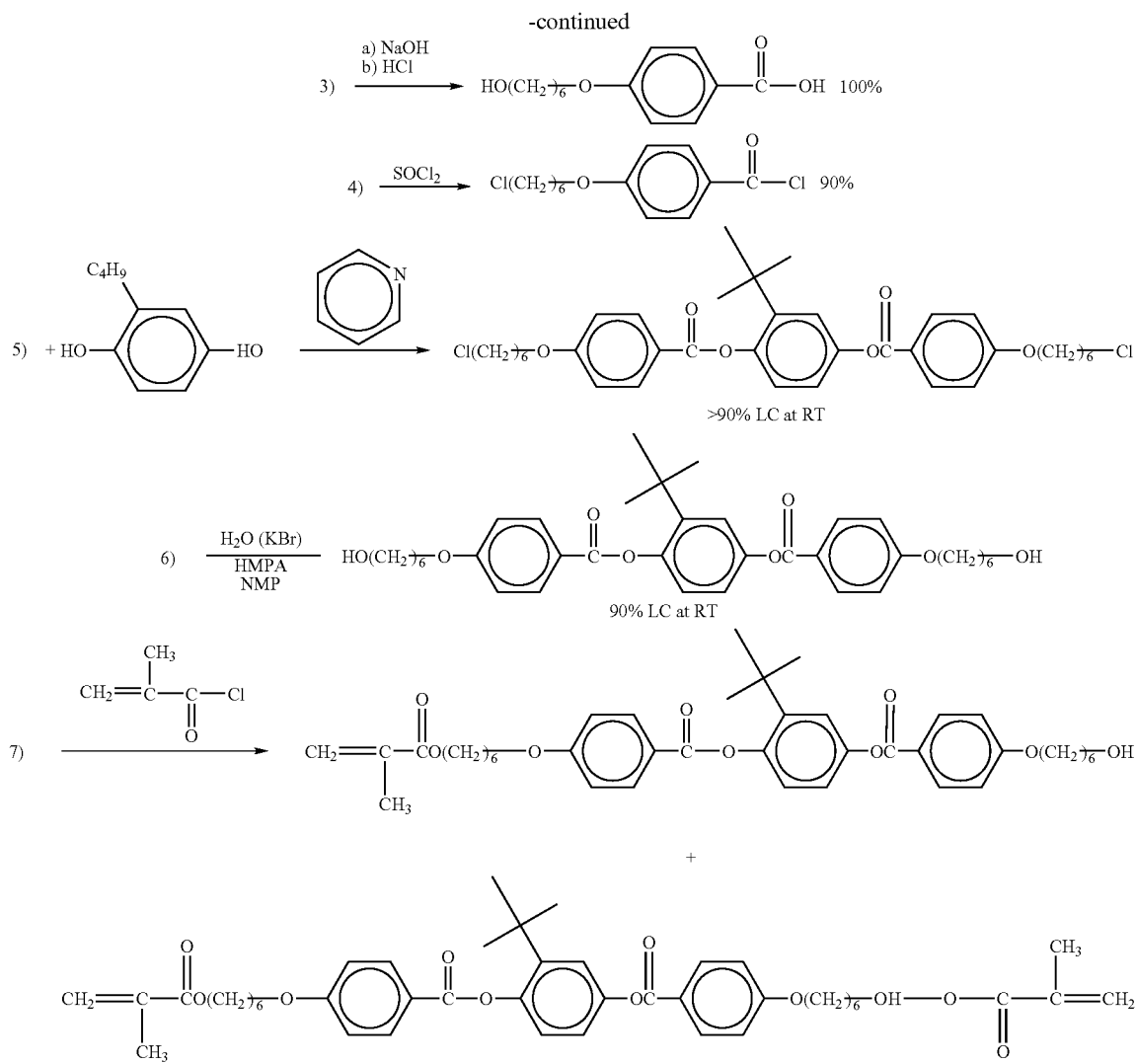

Exemplary "platform molecules" include, but are not necessarily limited to the molecule illustrated in (6) above.

To summarize Scheme 2, bis 1,4 [4"-(6'-chloroalkyloxy) benzyloxy] $R^2$-phenylene, preferably bis 1,4 [4"-(6'-chlorohexyloxy)benzoyloxy] t-butylphenylene, is converted to the analogous bis ω-hydroxy or ω-hydroxy chloro compound. The hydroxy-compound (the platform molecule) may be terminated with one or more polymerizable groups. Preferred polymerizable groups comprise nucleophilic and electron deficient groups, most preferably independently selected from the group consisting of acryloyl groups, methacryloyl groups, and cinnamoyl groups.

More particularly:

(1) 4-nitrobenzoic acid is dissolved in an excess of the desired 1,6-dihydroxyalkane, preferably 1.6-dihydroxyhexane, in the presence of a suitable esterification catalyst. Suitable catalysts include, but are not necessarily limited to titanium alkoxides, tin alkoxides, sulfonic acid, and the like. A preferred catalyst is $Ti(OBu)_4$. The dissolution occurs at atmospheric pressure at a temperature of from about 120° C. to about 140° C., with stirring. If excess alcohol is used, the majority product is the 6-hydroxyalkyl ester of 4-nitrobenzoic acid plus some bis 1,6-(4-nitrobenzoyloxy) alkane, preferably 1,6-(4-nitrobenzoyloxy) hexane. The byproduct water is removed using suitable means, preferably under vacuum during the course of the reaction.

(2) One or more suitable solvents are added to the reaction mixture, along with alkali salts of diols. Suitable solvents include, but are not necessarily limited to aprotic solvents in which nucleophilic attack is preferred. Examples include, but are not necessarily limited to dimethyl sulfoxide (DMSO), dimethyl formamide (DMF), dimethyl acetamide (DMAC), hexamethyl phosphonamide (HMPA), or N-methyl pyrrolidinone (NMP). A preferred solvent is dimethylsulfoxide (DMSO), which is environmentally safe and relatively inexpensive. Suitable salts comprise cations effective to displace hydrogen and to produce the mono-cation salt of the alkanediol, preferably the nucleophilic monosodium salt of hexanediol, in the presence of excess alkyldiol, preferably hexanediol. Preferred salts include, but are not necessarily limited to NaH or $KOBu^t$. The salt of the alkane diol, preferably hexane diol, then displaces the activated nitro group to produce 4-(1-hydroxyalkyloxy)benzoic acid (1-hydroxyalkyl ester) and some of the dimeric compound. A preferred product is 4-(1-hydroxyhexyloxy)benzoic acid (1-hydroxyhexyl ester) and some of the dimeric compound.

See N. Kornblum et al., J. Org. Chem., 41(9), 1560 (1976), incorporated herein by reference (nucleophilic displacement of nitro-group).

(3) The mixture from (2) is diluted with an aqueous base and heated to completely cleave the aryl-alkyl ester to produce the desired 4-(6'-hydroxyakyloxy)benzoic acid by precipitation subsequent to acidification. Suitable aqueous bases include, but are not necessarily limited to inorganic bases, a preferred base being aqueous sodium hydroxide. Suitable acids include, but are not necessarily limited to inorganic acids, a preferred acid being hydrochloric acid. In a preferred embodiment, 4-(1-hydroxyhexyloxy)benzoic acid (1-hydroxyhexyl ester) is diluted with aqueous sodium hydroxide and then acidified using hydrochloric acid to produce 4-(6'-hydroxyhexyloxy)benzoic acid. The supernatant contains sodium chloride and nitrite, which can be removed and recovered by vacuum evaporation of the solvent. In a preferred embodiment, the solvents evaporated are DMSO, hexanediol and water, which may be discarded. DMSO and hexanediol can be recovered from the water phase by known distillation procedures.

(4) In a preferred embodiment, for small scale procedures, a quantitative conversion of the 4-(6'-hydroxyalkyloxybenzoic acid to 4-(6'-chloroalkyloxy)benzoyl chloride is accomplished by mixing with thionyl chloride diluted in a suitable solvent, preferably toluene, in the presence of pyridine base. In a preferred embodiment, 4-(6'-hydroxyhexyloxy)benzoic acid is converted to 4-(6'-chlorohexyloxy)benzoyl chloride in this manner. On a larger scale, the foregoing reaction is implemented with simple addition of $SOCl_2$ and venting of the byproduct $SO_2$ and HCl.

(5) The highly reactive 4-(6'-chloroalkyl)benzoyl chloride is coupled to a hydroquinone bearing the desired bulky group, $R^2$. In a preferred embodiment, 4-(6'-chlorohexyl) benzoyl chloride is mixed at room temperature with t-butyl hydroquinone in ether with pyridine, used as catalyst and as a base to take up released HCl, to form bis 1,4 [4"-(6'-hydroxyhexyloxy)benzoyloxy]-t-butylphenylene. The reaction is quantitative and produces a high yield of the desired product. In addition, the bis 1,4 [4"-(6'-chloroalkyloxy) benzoyloxy]$R^2$-phenylene, preferably bis 1,4 [4"-(6'-chlorohexyloxy)benzoyloxy]t-butyl phenylene, is easily purified from the reaction mixture by crystallization. In addition, the bischlorocompound is stable and need not be stabilized against polymerization (as must bis-alkene compounds).

(6) The bischlorocompound is hydrolyzed to the platform molecule, preferably bis 1,4 [4"-(6'-chlorohexyloxy)benzoyloxy]t-butylphenylene, by simple heating in an aprotic solvent in the presence of water and potassium bromide [R. O. Hutchins and I. M. Taffer, J. Org. Chem, 48, 1360 (1983)]. Again, the reaction is quantitative with the product being purified by recrystallization. The reaction can be stopped at intermediate times to produce any desired mixture of monofunctional and difunctional alcohol molecules. In addition, the chloro-terminated molecules can be converted to the more reactive iodo-terminated species by simple exchange with NaI in acetone.

(7) The dialcohol or mixed alcohol/alkyl chloride is easily reacted with one or more polymerizable groups, preferably Michael addition reactants. In a preferred embodiment, one or more of the dialcohol ends is reacted with alkenyl acid chlorides to form reactive alkenyl esters, which can have any ratio of alkenyl ester, halide, or alcohol termini. The ratio can be adjusted to adjust the crosslink density and the liquid crystal transition temperatures. Alternately, one or more of the dialcohol ends may be reacted with alkenyl acid and the product may be reacted with alkenyl ester by transesterification.

Selective Ether Cleavage

In a preferred embodiment, 4-alkoxy benzoyl chloride, preferably commercially available 4-methoxy benzoyl chloride, is reacted with a hydroquinone substituted with a desired $R^2$ group to produce the corresponding aromatic ester, bis 1,4 [4-alkoxybenzoyloxy] phenylene, preferably bis 1,4 [4-methoxybenzoyloxy] phenylene. The reaction takes place in the presence of an appropriate HCl scavenger and solvent. Suitable HCl scavengers include, but are not necessarily limited to aromatic and aliphatic amines, with a preferred HCl scavenger being pyridine. The pyridine also may be used in combination with a trialkyl amines having from about 2–4 carbon atoms, preferably triethyl amine.

In a second "step," the alkoxy group is cleaved to result in a reactive hydroxyl group while leaving the aromatic ester and thus the triaromatic mesogen structure intact. See M. Node et al., J. Org. Chem., 45, 4275 (1980] (FIG. 7a), incorporated herein by reference. Node suggests hat the methyl ether of bis 1,4 [4-methoxybenzoyloxy] phenylene can be selectively cleaved in the presence of a nucleophile, preferably a thiol, and a Lewis acid, such as aluminum chloride, to produce bis 1,4 [4-hydroxybenzoyloxy] phenylene. [See M. Node et al., J. Org. Chem., 45, 4275 (1980)] ("Node"), incorporated herein by reference. However, Node describes cleaving methyl ethers in the presence of aliphatic esters—not in the presence of aromatic esters. In initial experiments using the conditions described in Node, the more unstable aromatic esters underwent significant ester cleavage because the product complex remained in solution where additional reaction can occur.

Surprisingly, selective cleavage of the aliphatic ether in the presence of the aromatic esters was induced at low temperatures using much higher methyl ether concentrations than those described in Node. Using high concentrations of the ether and much lower concentrations of the nucleophile induced a "complex"—containing the dihydroxy product with intact aromatic ester bonds—to precipitate from the reaction mixture as short reaction times as the complex was formed. The precipitated complex decomposed to the desired dihydroxy compound by reacting the complex with water and/or alcohol.

Suitable ethers for use in the reaction include, but are not necessarily limited to alkyl ethers, having from about 1 to about 8, preferably 1 to 4 carbon atoms. A most preferred ether is methyl ether. Suitable nucleophiles for use in the reaction include, but are not necessarily limited to aliphatic thiols. Preferred nucleophiles are liquid alkanethiols, which typically have 11 carbon atoms or less. A most preferred nucleophile is ethane thiol.

Preferably, a minimum amount of thiol is used to dissolve aluminum chloride in the presence of the ether and a solvent. A most preferred embodiment uses at least 1 mole of thiol per mole of alkyl ether, preferably 2 moles of thiol per mole of alkyl ether. A most preferred embodiment uses 7 mmol of the methyl ether per ml of ethane thiol.

The aluminum chloride to ether ratio should be 4:1 or more, as this appears to be the ratio needed for complexation. At ratios of aluminum chloride to thiol of above 5, more of the complex will stay in the solution before saturation occurs thus resulting in aromatic ester cleavage and reduced yield. The use of less aluminum chloride will result in an incomplete cleavage of the methyl ether. The use of more aluminum chloride, in excess of 4 to 1, has shown no effect in increasing the reaction rate, but slight excesses such as 4.5 to 1 can compensate for residual water in the system.

Suitable solvents for use in the reaction are halogenated solvents, preferably chlorinated solvents, most preferably dichloromethane. The solvent concentration can range from a molar excess of from about 3 to about 7, preferably about 5 or more, in relation to the nucleophile (thiol), as needed to keep the solution in a slurry as precipitate forms. However, dichloromethane above a 5 molar excess should be added slowly as the reaction proceeds since high initial concentration of the methylene chloride will hinder the reaction rate.

The reaction preferably is started under dry conditions at about 0° C. but can be allowed to warm to room temperature (~25° C.) as it proceeds. The reaction should not go above room temperature or ester cleavage can occur.

Upon increasing methyl ether concentration to 35× the concentrations used by Node, the solubility limit of the product complex was exceeded, permitting the complex to crystallize out of the reaction mixture before the aromatic esters had an opportunity to cleave. Quantitative yields were obtained when the complex crystallized directly from the reaction mixture, effectively removing the molecule from further reaction that would form side products:

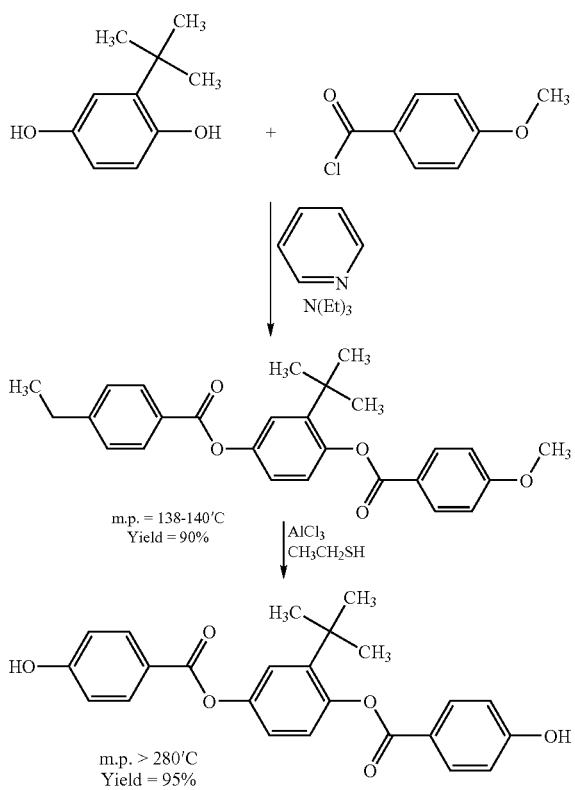

Methods for Controlling ΔT, and thereby Controlling Rheology of the Mesogens

The following are methods for suppressing $T_c$ and increasing $T_{n->isotropic}$ of such mesogens while maintaining a ΔT sufficient to produce a resin having low polymerization shrinkage, without adversely affecting physical properties of the cured product.

"Random End Substitution"

One way to suppress $T_c$ and to increase $T_{n->isotropic}$ while maximizing ΔT is "random end substitution," which is defined as randomly and independently substituting terminal functionalities and/or polymerizable groups for the one or both of the terminal hydroxyl groups of a platform molecule. A preferred platform molecule has the structure:

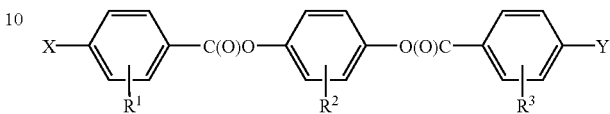

wherein X and Y are hydroxyl groups, $R^1$ and $R^3$ are hydrogens, and $R^2$ is a t-butyl group. In a preferred embodiment, X and Y are spacer groups. Where X and Y are the same $C_6$ spacer group, this platform molecule is herein abbreviated (for convenience only) as $C_6[H,TB,H](X)_2$. An example of a preferred platform molecule using this abbreviation is $C_6[H,TB,H](OH)_2$. An example of a preferred polymerizable mesogen using this abbreviation is $C_6[H,TB,H](MeAcry)_2$.

In random end substitution of $C_6[H,TB,H](X)_2$, experiments using methacryloyl groups and acetyl chloride generated blends with a range of transition temperatures. In some cases, crystallization was completely prevented:

| $C_6[H, TB, H](MeAcry)_2$ | $C_6[H, TB, H](OH)_2$ | $T_{n->i}$ |
|---|---|---|
| 0 wt % | 100 wt % | 92 |
|  | $C_6$(54MeAcry, 46OH) | 57 |
|  | $C_6$(70MeAcry, 30OH) | 52 |
| 100 |  | 40 |
|  | 100 | 50 |
|  | $C_6$(54MeAcry, 46Ace) | 43 |
|  | $C_6$(70MeAcry, 30Ace) | 41 |
| 100 |  | 40 |

Randomly substituted platform molecules preferably have a $T_c$ of from about 20° C. to about 37° C., and a ΔT of about 10° C. or more, preferably about 20° C. or more, most preferably about 30° C. or more. Preferred distributions for accomplishing this ΔT contain about 50 wt % or more, preferably about 60 wt % or more, more preferably about 70 wt % or more polymerizable end groups, most preferably methyacryloyl groups.

Blending with "Diluents"

Another method for suppressing $T_c$ and/or $T_{c->isotropic}$ while maximizing ΔT is physically mixing or blending polymerizable mesogens with a suitable diluent. Suitable diluents suppress crystallization, increase the isotropic to nematic transition temperature ($T_{n->n+1}$), maintain low polymerization shrinkage, and do not interfere with the mechanical properties of the end product. Suitable diluents comprise at least one end group which is polymerizable, and include but are not necessarily limited to polymerizable mesogens having a different transition temperature than the primary polymerizable mesogens, polymerizable elongated mesogens (described below), and mesogenic dimers.

The quantity of diluent blended with the polymerizable mesogen will vary depending upon the particular primary polymerizable mesogen, the transition temperature of the diluent, the impact of the diluent on the transition temperature of the blend, the quality of the final product, etc.

Blending with Polymerizable Mesogen Having a Different Transition Temperature

A variety of pure materials were mixed and the transition temperature of the mixture was measured. The results are shown below:

| $C_6[H,TB,H](MeAcry)_2$ | $C_6(Cl)_2$ | $T_{n \to 1}$ | $C_6(CIN)_2$ | $C_6(Cl)_2$ | $T_{n \to 1}$ |
|---|---|---|---|---|---|
| 0 wt % | 100 wt % | 83° C. | 0 wt % | 100 wt % | 83° C. |
| 50 | 50 | 61 | 50 | 50 | 58 |
| 67 | 33 | 52 | 67 | 33 | 47 |
| 80 | 20 | 46 | 82 | 18 | 35 |
| 100 | 0 | 40 | 90 | 10 | 28 |
|  |  |  | 100 | 0 | — |

The physical mixing of a material with a higher transition temperature and a material with a lower transition temperature generated a mixture with an intermediate transition temperature.

The transition temperatures of several platform molecules and polymerizable mesogens are listed in the following Table:

| Compounds $C_6[H, TB, H]X_2$ | $T_{n \to i}$ | $T_m$ | $T_g$ |  |
|---|---|---|---|---|
| $C_6[H, TB, H](H)_2$* | 94° C. | 70° C. | −8° C. | Ace=OC(O)Me |
| $C_6[H, TB, H](OH)_2$ | 91 | 80 | — | Acry=OC(O)CH=CH$_2$ |
| $C_6[H, TB, H](Cl)_2$ | (83) | 95 | — | MeAcry=OC(O)CMe=CH$_2$ |
| $C_6[H, TB, H](I)_2$ | (72) | 76 | — | CIN=OC(O)CH=CH(Phenyl) |
| $C_6[H, TB, H](Ace)_2$ | (50) | 82 | — |  |
| $C_6[H, TB, H](Acry)_2$ | (42) | 67 | −37 |  |
| $C_6[H, TB, H](MeAcry)_2$ | (40) | 57 | — |  |
| $C_6[H, TB, H](CIN)_2$ | — | 70 | — |  |

*Lee et al., Macromol., 27, 3955 (1994), incorporated herein by reference.

Substitution of the molecular terminus with an increasingly bulky group suppressed the $T_{n \to i}$ and $T_g$; however, a proportional suppression of the melting point was not observed. Of special interest was $C_6[H,TB,H](CIN)_2$ where the molecular distortion at the terminus was sufficient to preclude the existence of a liquid crystalline state. Blends containing up to 82 wt % $C_6[H,TB,H](CIN)_2$ still showed mesomorphic properties even though neat $C_6[H,TB,H](CIN)_2$ apparently was isotropic above its $T_g$.

In a preferred embodiment a primary polymerizable mesogen is mixed with about 50 wt % or less, preferably about 40 wt % or less, more preferably about 30 wt % or less of a diluent polymerizable mesogen having a nematic to isotropic transition temperature higher than the primary polymerization mesogen. A preferred embodiment is a mixture of about 50 wt % or less, preferably about 40 wt % or less, more preferably about 30 wt % $C_6[H,TB,H](Acry)_2$ as a diluent with $C_6[H,TB,H](MeAcry)_2$ as the primary polymerizable mesogen.

Blending with Dimers

Most preferred diluents comprise "mesogenic dimers," which have higher temperature nematic stability. As used herein, the phrase "mesogenic dimers" refers to dimers formed by reacting opposite ends of a bridging agent with X on one platform molecule or polymerizable mesogen and Y on a different platform molecule or polymerizable mesogen.

Examples of suitable bridging agents include, but are not necessarily limited to dicarboxylic acids (preferably α,ω-carboxylic acids) having from about 4 to about 12 carbon atoms, preferably from about 6 to about 10 carbon atoms, and oligodialkylsiloxanes preferably comprising alkyl groups having from about 1 to about 3 carbon atoms, most preferably methyl groups. A most preferred bridging agent is sebacic acid, herein sometimes referred to as "(seb)," which has 10 carbon atoms.

Briefly, in order to make the dimer molecule, a second mesogenic platform molecules, such as 1,4 [4′-hydroxybenzoyloxy] t-butylene, $C0[H,TB,H](OH)_2$, is synthesized by coupling p-anisoyl chloride with t-butyl hydroquinone and then cleaving the methoxy end groups with ethanethiol and aluminum chloride. This molecule can be further extended by reaction with p-anisoyl chloride and the same methoxy cleavage reaction. Fully aromatic diphenol terminated mesogens of any length can be thus produced.

Reaction of $C0[H,TB,H](OH)_2$ with a less than stoichiometric amount of methacryloyl chloride forms the monoester and diester. The monoester and diester are washed away from the diphenol starting material with methylene chloride and the monoester is separated from the diester as an insoluble solid by diluting the methylene chloride solution into hexane.

The monoester can be coupled to bifunctional sebacoyl chloride to form an alkyl diester linked, methacrylate terminated liquid crystalline monomer, $\{C0[H,TB,H](MeAcry)(O)\}_2$ (seb) with $T_{n \to 1}$ of 145° C. and a $T_g$ of 25° C. This monomer has no tendency to crystallize since the synthesis yields three different isomers with differing mutual orientation of t-butyl groups. However, processing close to room temperature, and thus $T_g$, is inconvenient because of the high viscosity of the material.

Preferred non-reactive dimeric and polymeric derivatives of $C_6[H,TB,H]$ type mesogenic cores are much more unlikely to crystallize [S. Lee et al., Macromol., 27(14), 3955 (1994)]. In addition, blends of non-reactive dimeric with monomeric derivatives (C₆[H,TB,H](Me)₂ generated a phase diagram with isotropic, isotropic+nematic and finally, at the lowest temperature, a nematic phase. Adding polymer to the monomer substantially increases $T_{n->n+1}$.

A minimum energy conformation of a preferred mesogenic dimer is decanedioic acid bis-(4-{2-tert-butyl-4-[4-(2-methyl-acryloxyloxy)-benzoyloxy]-phenoxycarbonyl}-phenyl) ester {C0[H,TB,H] (MeAcry)(O)}₂ (seb):

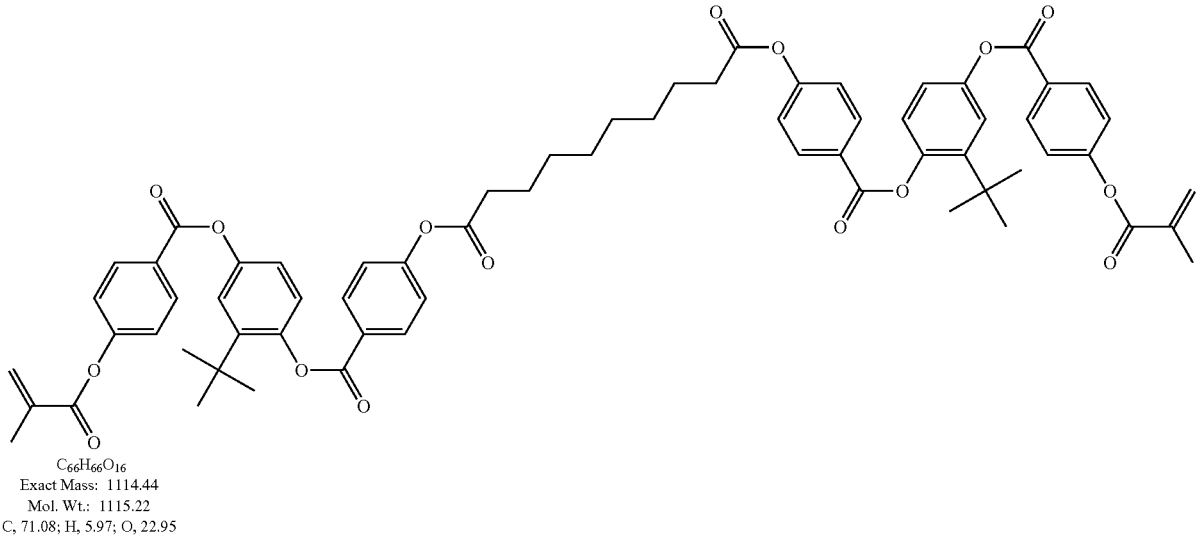

C₆₆H₆₆O₁₆
Exact Mass: 1114.44
Mol. Wt.: 1115.22
C, 71.08; H, 5.97; O, 22.95

Alternately, the partially or completely methacryloylated or acryloylated versions of decanedioic acid bis-(4-{2-tert-butyl-4-[4-(hydroxy)-benzoyloxy]-phenoxycarbonyl}-phenyl) ester and decanedioic acid bis-(4-{2-tert-butyl-4-[4-(2-methyl-acryloyloxy)-benzoyloxy]-phenoxycarbonyl}-phenyl) ester are made as illustrated below:

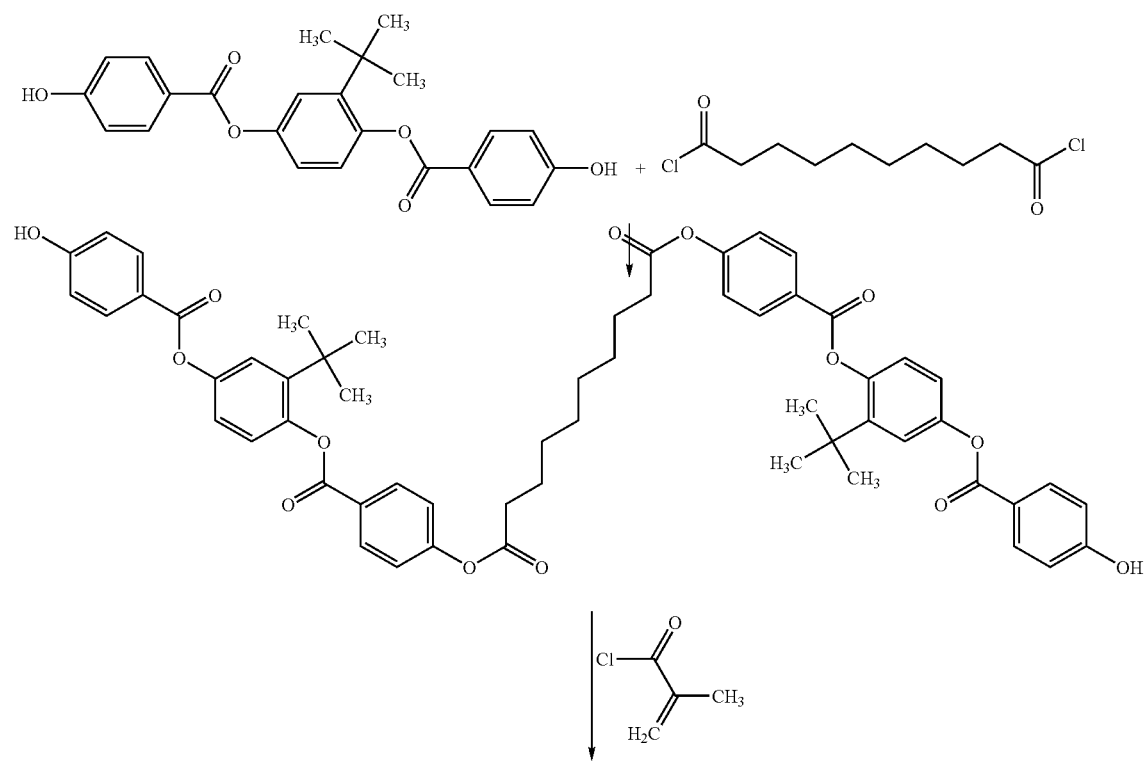

-continued

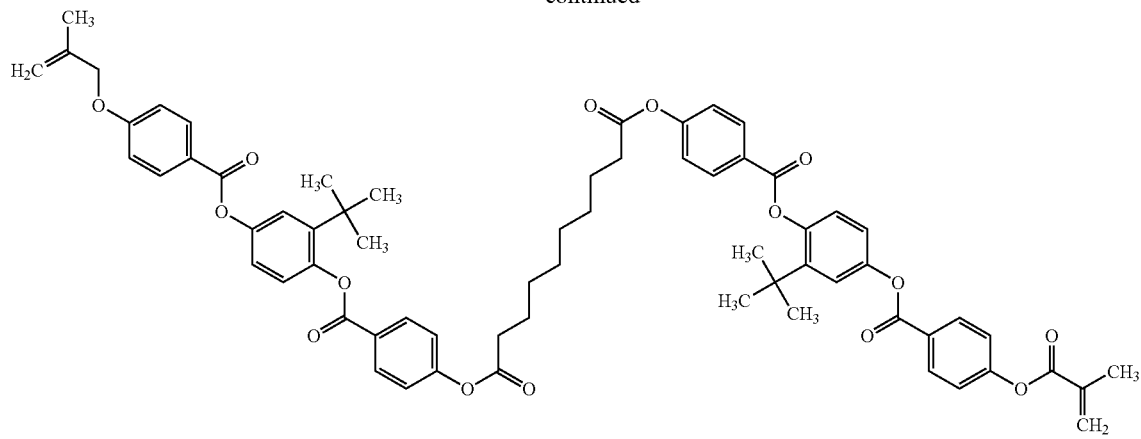

The first reaction product in the above figure is a novel alkylenedioic bis-(4-{2-alkyl-4-[4-(hydroxy)-benzoyloxy]-phenoxycarbonyl}-phenyl) ester having the following general structure:

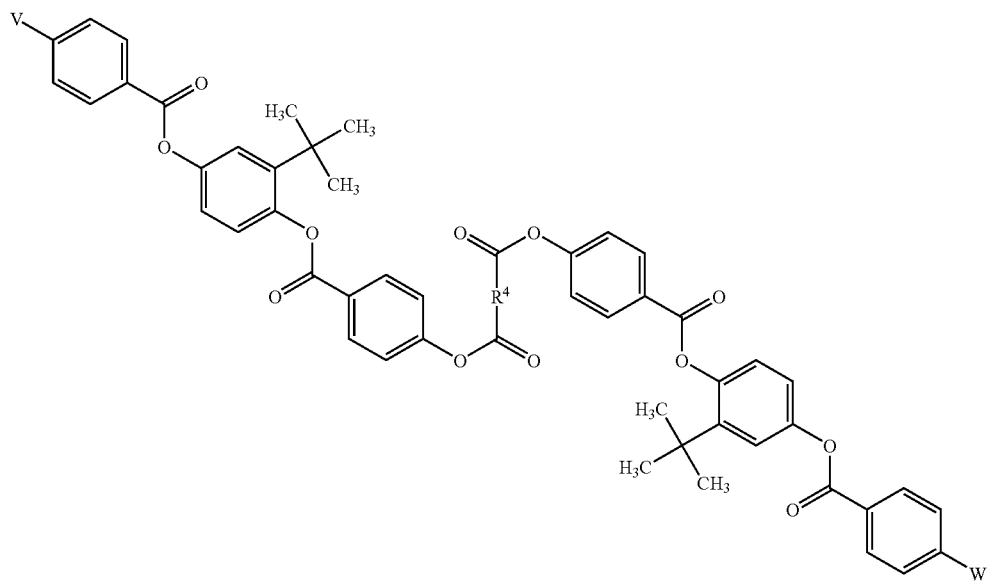

wherein
- $R^4$ has from about 2 to about 20 carbon atoms, preferably from about 2 to about 12 carbon atoms, and most preferably from about 6 to about 12 carbon atoms.
- the alkyl substituent on the central aromatic group of the aromatic ends includes, but is not necessarily limited to t-butyl groups, isopropyl groups, and secondary butyl groups. Most preferred are t-butyl groups; and,
- V and W are selected from the group consisting of terminal functionalities and polymerizable groups. In platform molecules, V and W are terminal functionalities. In polymerizable mesogens, V and/or W are polymerizable groups.

Suitable terminal functionalities independently are selected from the group consisting of hydroxyl groups, amino groups, and sulfhydryl groups. Most preferred terminal functionalities are hydroxyl groups.

Suitable polymerizable groups may be polymerized by nucleophilic addition, free radical polymerization, or a combination thereof. Preferred polymerizable groups are polymerizable by Michael addition. Michael addition requires the addition of a nucleophile and an electron deficient alkene. Groups suitable for polymerization by Michael addition include but are not necessarily limited to the examples found in A. Michael, *J. Prakt. Chem.* [2] 35, 349 (1887); R. Connor and W. R. McClelland, *J. Org. Chem.*, 3, 570 (1938); and C. R. Hauser, M. T. Tetenbaum, *J. Org. Chem.*, 23, 1146 (1959), all of which are incorporated by reference herein.

Examples of suitable polymerizable groups include, but are not necessarily limited to substituted and unsubstituted alkenyl ester groups comprising a polymerizable unsaturated carbon-carbon bond, wherein said alkenyl group has from about 2 to about 12 carbon atoms, preferably from about 2 to about 9 carbon atoms, more preferably from about 2 to about 6 carbon atoms. Preferred alkenyl esters are acryloyloxy alkoxy groups and methacryloyloxy alkoxy groups. V and W may be the same or different, depending upon the application. In a preferred application—a dental application—V and W comprises terminal alkenyl groups.

These alkylenedioic bis-(4-{2-alkyl-4-[4-(hydroxy)-benzoyloxy]-phenoxycarbonyl}-phenyl) esters are novel compounds, and may be used as "platform molecules," or polymerizable mesogens. A most preferred alkylenedioic bis-(4-{2-alkyl-4-[4-(hydroxy)-benzoyloxy]-phenoxycarbonyl}-phenyl) ester is decanedioic acid bis-(4-{2-tert-butyl-4-[4-(hydroxy)-benzoyloxy]-phenoxycarbonyl}-phenyl) ester.

In order to make the dihydroxyaromatic terminated mesogens, 1,4 bis(4'-hydroxybenzoyloxy) t-butylphenylene or bis-(4-{2-tert-butyl-4-[4-(hydroxy)-benzoyloxy]-phenoxy carbonyl}-phenyl) ester is dissolved in a solvent at a ratio of about 10 ml. solvent per gram. The material is dissolved in the solvent under an inert gas, preferably dry nitrogen. Suitable solvents are heterocyclic bases, with a preferred solvent being pyridine. This first mixture is diluted with a chlorinated organic solvent, preferably methylene chloride, in an amount equal to the volume of pyridine.

A second mixture is formed by dissolving an alkyloyl chloride in a chlorinated organic solvent at a ratio of about 10 ml solvent per gram of alkyloyl chloride. A preferred chlorinated organic solvent is methylene chloride. The alkyloyl chloride comprises an alkyl portion having from about 2 to about 20 carbon atoms, preferably from about 6 to about 20 carbon atoms, more preferably from about 6 to about 12 carbon atoms, and most preferably is sebacoyl chloride. This second mixture includes at least some of benzoquinone inhibitor, suitable concentrations being from about 1 to about 100 ppm, with a preferred concentration being about 10 ppm. The second mixture is added slowly to the first mixture with stirring, preferably with a syringe through a suba seal. After about 24 hours at room temperature, a precipitate is seen. The solvent, preferably methylene chloride and pyridine, are pumped off.

Any remaining pyridine is converted to a salt using a suitable acid, preferably hydrochloric acid, and the salt is removed by washing with water. Water is filtered off from the remaining white precipitate. Residual water is removed using a suitable solvent, preferably acetone, to dissolve the remaining precipitate, which is then stirred with a suitable amount of magnesium sulfate. The solution is dried down and a dissolved in a chlorinated organic solvent, preferably methylene chloride (DCM), is added to dissolve the solid. After 24 hours at room temperature the unreacted 1,4 bis(4'-hydroxybenzoyloxy) t-butylphenylene crystallizes out of solution as a white precipitate and separated from the mixture. The solution was then placed in the freezer overnight and decanedioic acid bis-(4-{2-tert-butyl-4-[4-(hydroxy)-benzoyloxy]-phenoxycarbonyl}-phenyl) ester precipitates out of solution. Silica and basic alumina may be added to absorb any remaining methacrylic acid or carboxylic acid terminated products.

Aromatic terminated mesogens (herein called "mesogenic dimers"), such as the foregoing, are used as a diluent and blended with the aliphatic terminated mesogens (herein called polymerizable mesogen) to form the polymerizable mixture. The quantity of mesogenic dimer in the blend will vary depending upon the dimer and its impact on transition temperature, final product, etc.

$T_{n\rightarrow n+I}$ and $T_{n+I\rightarrow 1}$ were determined for a variety of blends of difunctional monomer and dimer. Blends of {C0[H,TB,H] (MeAcry)(O)}$_2$ (seb) and C$_6$[H,TB,H] (MeAcry)$_2$ made by casting mixtures from methylene chloride on glass slides were examined by hot stage microscopy in polarized light. Several ppm benzophenone was added as an inhibitor so that high transition temperatures could be examined in the absence of polymerization.

As expected, all of the blends exhibited a low temperature, nematic phase, an intermediate temperature, a biphasic nematic-isotropic phase (n->n+I), and a high temperature, isotropic phase (n+I->I) (see Table below). The n->n+I transition was defined by the appearance of small non-birefringent regions and the n+I->I transition was identified by the complete disappearance of birefringence. The transition temperatures in the blends showed a hysteresis of about 5° C. and the Table below gives the highest temperatures. The low temperature transition was difficult to discern in the 81% C$_6$(MeAcry)$_2$ blend and therefore was not listed.

Transition Temperatures of Difunctional Monomer and Dimer Blends

| {CO(MeAcry)(O)}$_2$(seb) | C$_6$ (MeAcry)$_2$ | $T_{n\rightarrow +I}$ | $T_{n+I\rightarrow >I}$ |
|---|---|---|---|
| 0 wt % | 100 wt % | —° C. | 42° C. |
| 19 | 81 | — | 65 |
| 30 | 70 | 61 | 79 |
| 50 | 50 | 75 | 110 |
| 70 | 30 | 100 | 120 |
| 100 | 0 | — | 145 |

Suitable blends comprise at least some dimer, preferably about 5 wt % dimer or more, more preferably about 10 wt % dimer or more, even more preferably about 20 wt % dimer or more, and most preferably about 30 wt % dimer. A most preferred embodiment is a blend of 30 wt % of the dimer {C0[H,TB,H] (MeAcry)(O)}$_2$ (seb) with 70 wt % of C6[H, TB,H] (MeAcry)$_2$. The blend is a single phase nematic at room temperature and exhibits decreasing viscosity as the C$_6$[H,TB,H] (MeAcry)$_2$ percentage increases. The blend of 30 wt % {C0[H,TB,H] (MeAcry)(O)}$_2$ (seb) to 70 wt % C$_6$[H,TB,H] MeAcry)$_2$ yielded a monotropic, nematic fluid with a $T_{n\rightarrow >I+n}$ of 61° C. and $T_{n+I\rightarrow >I}$ of 79° C. that showed no tendency to crystallize.

The biphasic region in the blends resembled a pointed ellipse whose ends were pinned at the 100% dimer or 100% monomer $T_{n\rightarrow >I}$ with a strongly concentration dependent $T_{n\rightarrow n+I}$ and $T_{n+I\rightarrow >1}$.

Blending with Elongated Polymerizable Mesogens

Other suitable diluents are elongated polymerizable mesogens. In order to make these elongated polymerizable mesogens, the diphenolic platform molecule, preferably 1,4 [4'-hydroxybenzoyloxy] t-butylphenylene, is further extended by reaction with p-anisoyl chloride and subsequent ether methyl group cleavage with aluminum chloride and ethane thiol. Fully aromatic diphenol terminated mesogens of any length can be thus produced. Reaction with acryloyl or methacryloyl chloride forms the monoester, which can be coupled to reactive aliphatic or siloxane oligomers to form polymerizable liquid crystals with reactive ends.

The diphenolic platform mesogens can be lengthened by reacting additional 4-methoxy benzoyl chloride with bis 1,4 [4'-methoxybenzoyloxy] t-butylphenylene to produce the dimethoxy compound with four or five aromatic rings, depending upon the reaction ratios. Cleavage with Lewis acid and thiol produces the respective elongated diphenolic platform molecules.

For example, an excess of anisoyl chloride is mixed with a desired 1,4 bis(4'-hydroxylbenzoyl oxy)-R$^2$ phenylene, (preferably a t-butylphenylene) in an excess of pyridine and triethyl amine (about a 10:1 ratio) with stirring under nitrogen for several hours, preferably about 4 hr. The pyridine is removed under vacuum, and the mixture is extracted into ethyl ether. Amine hydrochloride is removed by vacuum filtration and the remaining solids are washed with a suitable solvent, such as water and acetone. The product had a melting point of 222–224° C. and the structure of the molecule was confirmed by NMR to be the following aromatic dimethoxy compound:

laminoethyl methacrylate activator and subsequently pumping off the solvent, all under yellow light. The monomers were then polymerized in film or droplet form in less than 1 minute by exposure to a dental curing light (Dentsply Spectrum Curing Lamp) with a significant output at 420 nm.

FTIR spectroscopy (Nicolet Magna-IR 560) was used to measure the degree of cure by observing the decrease in the 1637 $cm^{-1}$ alkene band vs. the aromatic internal thickness band at 1603 $cm^{-1}$. Thin film measurements that avoided

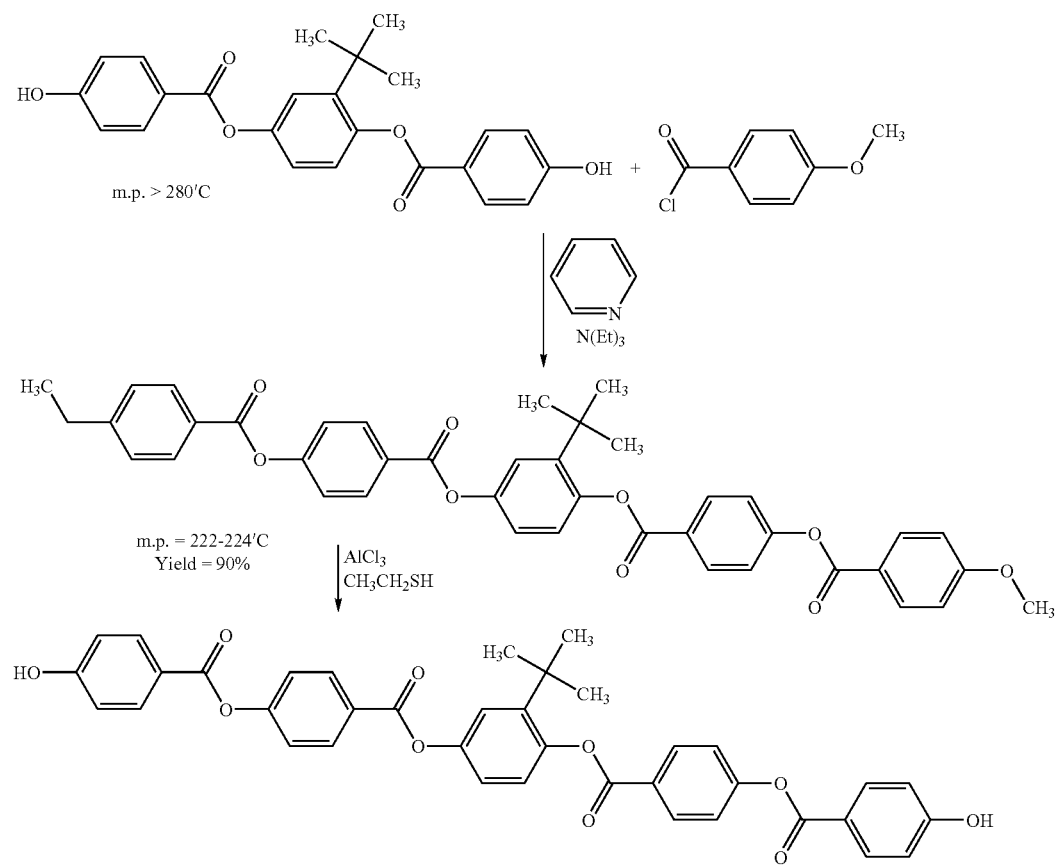

The phenolic end group(s) are esterified by acyl chlorides, thus providing a route to polymerizable mesogens.

The elongated polymerizable mesogens are used as diluent and blended with the primary polymerizable mesogen. The quantity of elongated polymerizable mesogen blended will vary depending upon the elongated mesogen and its impact on transition temperature, final product, etc. Preferably, about 5 wt % or more, more preferably about 10 wt % or more, even more preferably about 20 wt % of more, and most preferably about 30 wt % of the elongated mesogen is mixed with the primary polymerizable mesogen, preferably $C_6[H,TB,H]$ $(MeAcry)_2$.

Low Polymerization Shrinkage

The polymerizable mesogens described exhibit low polymerization shrinkage, preferably about 3 vol. % change or less, more preferably about 2 vol. % change or less. Bis-alkene terminated mesogens were prepared for polymerization by codissolving the $C_6[H,TB,H](X)_2$ based monomer in dichloromethane with 0.3 wt. % camphorquinone photoinitiator, 100 ppm benzoquinone and 1 wt. % N,N' dimethyoxygen inhibition were performed by sandwiching the monomer between polyvinylidene chloride films, which had an optical window in the wavelength ratio of interest. The IR spectrum of solid droplets was evaluated using a single bounce reflectance measurement. The flat bottom surface of the droplet was pressed against the germanium lense of a Spectra Tech Thunderdome attachment.

Polymerization of the monomer $C_6[H,TB,H](MeAcry)_2$ could be observed between transparent polyvinylidene chloride films under cross-polarized optical microscopy in the heated stage of a Nikon Optimat microscope. Little change in the local birefringence and thus local orientation was noted upon polymerization at room temperature or upon heating to 180° C.

The following shows the very low, ultimate polymerization shrinkage induced by visible light photoexposure measured for $C_6(70MeAcry,30\ OH)$ after 90% double bond conversion (by IR).

The liquid crystal material mixture exhibited polymerization shrinkage of only about 1.58% at room temperature compared to the unfilled dental resin (GTE-10.42%) and the filled commercial dental resin (Z100-2.30%, also referred to as the "GTE" resin). Some of the improved polymerization shrinkage in the liquid crystal monomer in comparison to the GTE resin originates in the lower concentration of double bonds in the LC material (50% of that found in the GTE blend) and in the fact that GTE resin polymerizes to slightly lower conversions (70%). The difference between the expected 3.5% for the LC and the observed 1.8% lies in the disordering that occurs upon conversion of the monomer nematic state to the polymeric nematic state.

Fracture Toughness

Compact tension samples (ASTM E399) with known edge crack length are fabricated by photocuring monomer with initiator and activator in silicone molds. After polishing the surface with 600 grit polishing agent and soaking in physiologic saline at 37° C. for 24 hours the samples are tested at room temperature under displacement control at 1 mm/min until failure.

The fracture toughness is as high as possible, suitably 0.4 Mpa-m$^{1/2}$ or higher, preferably 0.5 MPa-m$^{1/2}$ or higher, which is the same as that found for photocured, isotropic dimethacrylate based resins such as GTE resin.

Fillers

Considerable amounts of soluble impurity can be added to the polymerizable mesogens, or a mixture comprising the polymerizable mesogens, without changing the $T_{nematic->isotropic}$ transition temperature of the polymerizable mesogens. Thus, a high volume fraction of filler can be added to the polymerizable mesogens and still form a composite that maintains desirable, low viscosity flow and low polymerization shrinkage characteristics at temperatures of curing. Commercial products add up to about 70–80 wt % filler. A preferred embodiment uses about 30 wt. % filler.

A variety of fillers may be used. A preferred filler is amphoteric nano-sized metal oxide particles having a diameter in nanometers which is sufficiently small to provide transparency effective for photopolymerization but sufficiently large to provide effective fracture toughness after photopolymerization. Substantially any "metal" capable of forming an amphoteric metal oxide may be used to form the metal oxide particles. Suitable metallic elements include, but are not necessarily limited to niobium, indium, titanium, zinc, zirconium, tin, cerium, hafnium, tantalum, tungsten, and bismuth. Also suitable in place of the metal in the oxide is the semi-metallic compound, silicon. As used herein, unless otherwise indicated, the term "metal oxide" is defined to include silicon, and the word "metal," when used to refer to the metal oxide is intended to also refer to silicon.

The metal oxides may be made of a single metal, or may be a combination of metals, alone or combined with other impurities or "alloying" elements, including, but not necessarily limited to aluminum, phosphorus, gallium, germanium, barium, strontium, yttrium, antimony, and cesium.

A monomeric liquid crystal (LC) containing a high volume fraction of filler nanoparticles is a highly constrained system. As a result, at least for some monomeric species, both smectic and crystalline transitions should be suppressed. The consequent widening of the stability range of nematic mesophase should permit the composite to polymerize at much lower temperatures than in unfilled systems, resulting in lower polymerization shrinkage.

The metal oxide nanoparticles may be prepared using any known methods, such as "sol-gel" techniques, direct hydrolysis of metal alkoxides by water addition, forced hydrolysis of relatively low-cost metal salts, or non-hydrolytic reactions of metal alkoxides with metal halide salts. Examples of such procedures are shown in the following references, each of which is incorporated herein by reference: W. Stöber and A. Fink, J. of Colloid and Interface Science, v. 26, 62–69 (1968); M. Z.-C. Hu, M. T. Harris, and C. H. Byers, J. of Colloid and Interface Science, v. 198, 87–99 (1988); M. Ocaña and E. Matijević, J. of Materials Research, v. 5(5), 1083–1091 (1990); L. Lerot, F. LeGrand, P. de Bruycker, J. of Materials Science, v. 26, 2353–2358 (1991); H. Kumazawa, Y. Hori, and E. Sada, The Chemical Eng'g. Journal, v. 51, 129–133 (1993); S. K. Saha and P. Pramanik, J. of Non-Crystalline Solids, v. 159, 31–37 (1993); M. Andrianainarivelo, R. Corriu, D. Leclercq, P.H. Mutin, and A. Vioux, J. of Materials Chemistry, v. 6(10), 1665–1671 (1996); F. Garbassi, L. Balducci, R. Ungarelli, J. of Non-Crystalline Solids, v. 223, 190–199 (1998); J. Spatz, S. Mössmer, M. Mo[umlaut]ller, M. Kocher, D. Neher, and G. Wegner, Advanced Materials, v. 10(6), 473–475 (1998); R. F. de Farias, and C. Airoldi, J. of Colloid and Interface Science, v. 220, 255–259 (1999); T. J. Trentler, T. E. Denler, J. F. Bertone, A. Agrawal, and V. L. Colvin, J. of the Am. Chemical Soc., v. 121, 1613–1614 (1999); Z. Zhan and H. C. Zheng, J. of Non-Crystalline Solids, v. 243, 26–38 (1999); M. Lade, H. Mays, J. Schmidt, R. Willumeit, and R. Schomäcker, Colloids and Surfaces A: Physiochemical and Eng'g Aspects, v. 163, 3–15 (2000); and the procedure described in "Sol-gel processing with inorganic metal salt precursors," authored by "Michael" Zhong Cheng Hu, licensable via Oak Ridge National Laboratory under ORNL control number ERID 0456.

The application will be better understood with reference to the following examples, which are illustrative only:

EXAMPLE 1

Synthesis of bis 1,4 [4"-(6'-Z-hexyloxy)benzoyloxy] t-butylphenylene, Z=46 mole % OH, 54 mole % methacryloxy 10 g (0.0165 mole) of bis 1,4 [4"-(6'-hydroxyhexyloxy) benzoyloxy] t-butylphenylene was dissolved in 200 ml dry methylene chloride containing 100 ppm benzoquinone (free radical quencher). After cooling the above solution to 0° C. 1.75 ml (0.018 mole) distilled methacryloyl chloride was then added along with 1.5 ml (0.018 mole) pyridine, and the solution was stirred for 24 hours in a sealed flask making no attempt to remove air from the solvent.

The solvent was vacuum-evaporated and the resultant solid taken up in 250 ml ether and washed with 250 ml 0.1N HCl and 250 ml saturated NaCl. After drying with MgSO$_4$ and filtering, the solvent was evaporated to yield 10 g of the desired product as a nematic liquid, such was 54 mole % methacryloxy and 46 mole % hydroxyterminated by NMR. This material could be not be crystallized even after prolonged storage at −20° C.

Liquid crystal monomers containing a variation in the OH substitution by functional groups could be made by adapting the above synthesis with an appropriate amount of methacryloyl or acryloyl chloride.

EXAMPLE 2

Synthesis of bis 1,4 [4"-(6'-Z-hexyloxy)benzoyloxy] t-butylphenylene, Z=46 mole % acetyloxy, 54 mole % methacryloxy 4.31 g (0.006 mole) of bis 1,4 [4"-(6'-Z-hexyloxy)benzoyloxy] t-butylphenylene, Z=46 mole % OH, 54 mole % methacryloxy was dissolved in 100 ml dry methylene chloride containing 100 ppm benzoquinone (free radical quencher). After cooling the above solution to 0° C., 0.5 ml (0.007 mole) distilled acetyl chloride was then added along with 0.54 ml pyridine, and the solution was stirred for 24 hours in a sealed flask making no attempt to remove air from the solvent.

The solvent was vacuum-evaporated and the resultant solid taken up in 100 ml ether and washed with 100 ml 0.1 N HCl and 100 ml saturated NaCl. After drying with MgSO$_4$ and filtering, the solvent was evaporated to a quantitative yield of the desired product as a nematic liquid, which was 54 mole % methacryloxy and 46 mole % acetyloxy by NMR. This material could be not be crystallized even after prolonged storage at −20° C.

EXAMPLE 3

Synthesis of 1,4 Bis(4'-methacryloylbenzoyloxy) t-butylphenylene and 1-(hydroxybenzoyloxy),4-(4-methacryloylbenzoyloxy) t-butylphenylene 0.2 g (4.92×10$^{-4}$ mole) 1,4 bis(4'-hydroxybenzoyloxy) t-butylphenylene was dissolved in 1 ml pyridine containing 10 ppm benzophenone, and to this was slowly added 0.026 ml (2.46×10$^{-4}$ mole) methacryloyl chloride dissolved in 2 ml methylene chloride. After stirring for 12 hours at room temperature, the methylene chloride was pumped off and the remaining pyridine solution was diluted into 0.1 N HCl to neutralize the pyridine and precipitate the product. After washing the precipitate with water and drying under vacuum, the precipitate was taken up into ether and dried with MgSO$_4$. After ether evaporation, the suspension was taken up into 3 ml methylene chloride in which the starting diphenol was insoluble. After filtering away the diphenol, the monomethacrylate (T$_m$=230° C.) was crystallized from the remaining solution at room temperature by the addition of 3 ml hexane. The remaining clear solution contained mainly the dimethacrylate in very small amounts (T$_m$=142° C.).

EXAMPLE 4

Synthesis of bis-(4-{2-tert-butyl-4-[4-(2-methylacryloyloxy)-benzoyloxy]-phenoxycarbonyl}-phenyl) ester {C0[H,TB,H] (MeAcry)(O)}$_2$ In order to make decanedioic acid bis-(4-{2-tert-butyl-4-[4-(2-methylacryloyloxy)-benzoyloxy]-phenoxycarbonyl}-phenyl) ester {C0[H,TB,H] (MeAcry)(O)}$_2$ (seb), 0.95 g, 1.95 mmole of 1-(hydroxybenzoyloxy),4-(4'-methacryloylbenzoyloxy) t-butylenephenylene was dissolved in 10 ml dry pyridine under dry nitrogen and then diluted with 20 ml dry methylene chloride. 0.233 g sebacoyl chloride (0.975 mmol) was dissolved in 10 ml dry methylene chloride containing 10 ppm benzoquinone inhibitor and added slowly with syringe through a suba seal into the first solution with stirring. After 29 hours at room temperature a small amount of precipitate was seen and the methylene chloride was pumped off and 0.01 g paradimethylaminopyridine was added as a catalyst to continue the reaction.

After another 24 hours at room temperature, some unconverted phenol was still observed by TLC and 0.5 ml methacryloyl chloride was dissolved in 10 ml dry methylene chloride and added to the reaction mixture to react any unconverted starting material to the dimethacrylate. After 3 hours the phenol has been completely converted and methylene chloride was removed under vacuum.

100 ml of water containing 7.5 ml concentrated HCl was added to the flask with stirring and stirred for four hours to remove the pyridine as the hydrochloride salt (pH=4). The water layer could be poured from the white layer which stuck to the walls of the vessel. After washing once more with deionized water, 100 ml methylene chloride was added to dissolve the solid and the resulting organic phase was transferred to a separatory funnel and washed twice with 100 ml brine saturated water and dried with magnesium sulfate. One gram each of silica and basic alumina were added to absorb any remaining methacrylic acid or carboxylic acid terminated products.

After standing for 8 hours the methylene chloride solution was filtered and added to 500 ml of stirred hexane. After 8 hours the pure precipitated product was collected; the supernatant contained methacrylated starting material.

The white precipitate eluted in 80/20 ether/hexane on silica as a major spot and a very faint following spot. NMR revealed about 95% purity of the desired product (30% yield) with the rest being a methoxy terminated product which was carried over from the diphenol starting material. Solutions could be cast into a translucent, nematic glass at room temperature which gradually softened upon heating.

EXAMPLE 5

Synthesis of Decanedioc acid bis-(4-{2-tert-butyl-4-[4-(hydroxy)benzoyloxy]-phenoxycarbonyl}-phenyl) ester 18.25 g, (44.9 mmole) of 1,4 bis(4'-hydroxybenzoyloxy) t-butylphenylene was dissolved in 120 ml dry pyridine under dry nitrogen and then diluted with 100 ml dry methylene chloride. 1.34 g sebacoyl chloride (5.60 mmol) was dissolved in 20 ml dry methylene chloride and added slowly with syringe through a suba seal into the first solution with stirring. After 24 hours at room temperature a small amount of precipitate was seen and the methylene chloride and pyridine were pumped off 300 ml of water containing 7.5 ml concentrated HCl was added to the flask with stirring and stirred for four hours to remove the pyridine as the hydrochloride salt (pH=4). The water was filtered off from the precipitate that formed in the vessel. 200 ml of acetone was added to dissolve the mixture which was then stirred with 3 grams of magnesium sulfate to remove any remaining water, after which the solution was dried down. 200 ml methylene chloride (DCM) was added to dissolve the solid. After 24 hours at room temperature the unreacted 1,4 bis(4'-hydroxybenzoyloxy) t-butylphenylene crystallized out of solution as a white precipitate. The solution was then placed in the freezer overnight and decanedioic acid bis-(4-{2-tert-butyl-4-[4-(hydroxy)-benzoyloxy]-phenoxycarbonyl}-phenyl) ester precipitated out of solution.

The white precipitate eluted in 90/10 DCM/acetone on silica as a major spot and a very faint spots resulting from higher order polymerization. The product had a high NMR purity (>95%).

EXAMPLE 6

Synthesis of Decanedioic acid bis-(4-{2-tert-butyl-4-[4-(2-methyl-acryloyloxy)-benzoyloxy]-phenoxycarbonyl}-phenyl) ester 0.85 g, (0.868 mmole) of decanedioic acid bis-(4-{2-tert-butyl-4-[4-(hydroxy)-benzoyloxy]-phenoxycarbonyl}-phenyl) ester was dissolved in 20 ml dry pyridine under dry nitrogen and then diluted with 20 ml dry methylene chloride 0.118 g methacrylol chloride (1.13 mmol) was dissolved in 10 ml dry methylene chloride containing 10 ppm benzoquinone inhibitor and added slowly with syringe through a suba seal into the first solution with stirring. After 24 hours at room temperature a small amount of precipitate was seen and the methylene chloride and pyridine were pumped off.

100 ml of water containing 1.0 ml concentrated HCl was added to the flask with stirring and stirred for two hours to remove the pyridine as the hydrochloride salt (pH=4). The water layer could be poured from the white layer, which struck to the walls of the vessel. After washing once more with deionized water. 50 ml methylene chloride was added to dissolve the solid and the resulting organic phase was transferred to a separatory funnel and washed twice with 100 ml brine saturated water and dried with magnesium sulfate. One gram each of silica and basic alumina were added to absorb any remaining methacrylic acid or carboxylic acid terminated products. NMR revealed that the product was the desired dialkene terminated monomer.

Persons of ordinary skill in the art will recognize that many modifications may be made to the present invention without departing from the spirit and scope of the present invention. The embodiment described herein is meant to be illustrative only and should not be taken as limiting the invention, which is defined in the following claims.

We claim

1. A method for producing a blend comprising:
providing a first phenylene ring consisting essentially of a first functional group at a para-position to a first halogenated carboxylic group;
providing a second phenylene ring consisting essentially of a second functional group at a para-position to a second halogenated carboxylic group;
providing a third phenylene ring comprising $R^2$ and comprising a first functionality at a para-position to a second functionality; and
forming a mixture comprising said first phenylene rings, said second phenylene rings, and said third phenylene rings;
exposing said mixture to first conditions effective to react said first halogenated carboxylic group with said first functionality to produce a first ester bond, said first conditions being effective to react said second halogenated carboxylic group with said second functionality to produce a second ester bond, producing a reaction product comprising said first functional group at position para- to said first ester bond and said second functional group at a position para- to said second ester bond; and
treating said reaction product under second conditions effective to produce platform molecules having the following general structure:

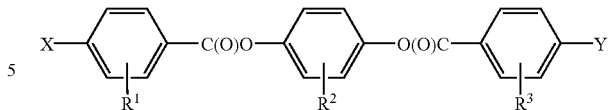

wherein X and Y comprise hydroxyl groups;
$R^2$ is a bulky organic group whereby, when both X and Y are reacted with polymerizable groups to produce polymerizable mesogens, $R^2$ provides sufficient steric hindrance to achieve a nematic state at room temperature while suppressing crystallinity of said polymerizable mesogens at room temperature; and, $R^1$ and $R^3$ are selected from groups less bulky than $R^2$; and
substituting one or more member selected from the group consisting of X and Y with a moiety comprising a polymerizable group.

2. The method of claim 1 wherein the blend has a $T_c$ of from about 20° C. to about 37° C.

3. The method of claim 2 wherein the blend has a ΔT of about 10° C. or more and one member selected from the group consisting of X and Y comprises a polymerizable group in about 50 wt. % or more of said blend.

4. The method of claim 1 wherein the blend has a ΔT of about 10° C. or more and one member selected from the group consisting of X and Y comprises a polymerizable group in about 70 wt. % or more of said blend.

5. The method of claim 1 wherein said moiety comprises polymerizable groups selected from the group consisting of acryloyl groups, methacryloyl groups, and cinnamoyl groups.

6. The method of claim 3 wherein said moiety comprises polymerizable groups selected from the group consisting of acryloyl groups, methacryloyl groups, and cinnamoyl groups.

7. The method of claim 4 wherein said moiety comprises polymerizable groups selected from the group consisting of acryloyl groups, methacryloyl groups, and cinnamoyl groups.

8. The method of claim 3 comprising producing said blend having a ΔT of about 20° C. or more.

9. The method of claim 3 comprising producing said blend having a ΔT of about 30° C. or more.

10. The method of claim 7 comprising producing said blend having a ΔT of about 20° C. or more.

11. The method of claim 7 comprising producing said blend having a ΔT of about 30° C. or more.

12. A method for producing a blend comprising:
providing a first phenylene ring consisting essentially of a first functional group at a para-position to a first halogenated carboxylic group;
providing a second phenylene ring consisting essentially of a second functional group at a para-position to a second halogenated carboxylic group;
providing a third phenylene ring comprising $R^2$ and comprising a first functionality at a para-position to a second functionality; and
forming a mixture comprising said first phenylene rings, said second phenylene rings, and said third phenylene rings;
exposing said mixture to first conditions effective to react said first halogenated carboxylic group with said first functionality to produce a first ester bond, said first conditions being effective to react said second halogenated carboxylic group with said second functionality to produce a second ester bond, producing a reaction product comprising said first functional group at position para- to said first ester bond and said second functional group at a position para- to said second ester bond, one or more of said first functional group and said second functional group being selected from the group consisting of H—(CH$_2$)$_n$—O— groups, Cl(CH$_2$)$_n$—O— groups, Br(CH$_2$)$_n$—O— groups, derivatives thereof, wherein n is from about 2 to about 12 and CH$_2$ independently is selected from the group consisting of CH$_2$ which is unsubstituted and CH$_2$ which is substantially by an element selected from the group consisting of oxygen, sulfur, and an ester group; provided that at least 2 carbon atoms separates said oxygen or said ester group; and treating said reaction product under second conditions effective to hydrolyze said first functional group and said second functional group, producing platform molecules having the following general structure:

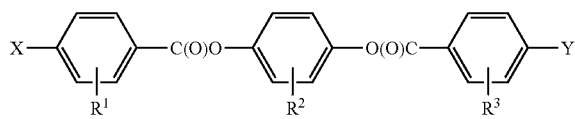

wherein X and Y comprise hydroxyl groups;
R$^2$ is a bulky organic group whereby, when both X and Y are reacted with polymerizable groups to produce polymerizable mesogens, R$^2$ provides sufficient steric hindrance to achieve a nematic state at room temperature while suppressing crystallinity of said polymerizable mesogens at room temperature; and,
R$^1$ and R$^3$ are selected from groups less bulky than R$^2$; and reacting one or more member selected from the group consisting of X and Y with a moiety comprising a polymerizable under third conditions effective to produce said blend, wherein one member selected from the group consisting of X and Y comprises a polymerizable group in about 50 wt % or more of said blend, said blend having a T$_c$ of from about 20° C. to about 37° C. and a ΔT of about 10° C. or more.

13. The method of claim 12 wherein one member selected from the group consisting of X and Y comprises a polymerizable group in about 60 wt. % of said blend.

14. The method of claim 12 wherein one member selected from the group consisting of X and Y comprises a polymerizable group in about 70 wt. % of said blend.

15. The method of claim 12 wherein said moiety comprises polymerizable groups selected from the group consisting of acryloyl groups, methacryloyl groups, and cinnamoyl groups.

16. The method of claim 12 wherein said moiety comprises polymerizable groups selected from the group consisting of acryloyl groups, methacryloyl groups, and cinnamoyl groups.

17. The method of claim 14 wherein said moiety comprises polymerizable groups selected from the group consisting of acryloyl groups, methacryloyl groups, and cinnamoyl groups.

18. The method of claim 12 comprising producing said blend having a ΔT of about 20° C. or more.

19. The method of claim 12 comprising producing said blend having a ΔT of about 30° C. or more.

20. The method of claim 17 comprising producing said blend having a ΔT of about 20° C. or more.

21. The method of claim 17 comprising producing said blend having a ΔT of about 30° C. or more.

22. The method of claim 12 wherein said second conditions comprise heating said reaction product in an aprotic solvent in the presence of water and potassium bromide to produce a reaction mixture comprising said platform molecules.

23. The method of claim 12 wherein said third conditions comprise
recrystallizing said platform molecules from said reaction mixture; and,
reacting one or more of X and Y in recrystallized platform molecules with halogenated carboxyl group comprising a polymerizable group.

24. The method of claim 22 wherein said third conditions comprise
recrystallizing said platform molecules from said reaction mixture; and,
reacting one or more of X and Y in recrystallized platform molecules with halogenated carboxyl group comprising a polymerizable group.

25. A method of producing a blend comprising:
providing 4 alkoxy benzoyl chloride molecules comprising benzyl chloride groups at a position para- to alkyl ether groups;
providing R$^2$-hydroquinone molecules comprising first hydroxyl groups and second hydroxyl groups at para- positions;
forming a mixture comprising said 4-alkoxy benzoyl chloride molecule and said R$^2$ hydroquinone molecules; and,
exposing said mixture to first conditions effective to react a first benzoyl chloride group on a first 4-alkoxy benzoyl chloride molecule with said first hydroxyl group to produce a first ester bond, said first conditions being effective to react a second benzoyl chloride group on a second 4-alkoxy-benzoyl chloride molecule with said second hydroxyl group to produce a second ester bond, producing a reaction product comprising said first alkyl ether group at a position para- to said first ester bond and said second alkyl ether group at a position para- to said second ester bond;
treating said bis terminal alkoxy groups under second conditions effective to cleave at least one of said first alkyl ether group and said second alkyl ether group to produce a reaction product comprising one or more platform molecules have the following general structure:

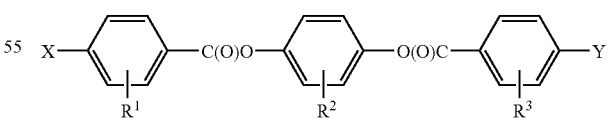

wherein one or more of X and Y comprises hydroxyl groups;
R$^2$ is a bulky organic group whereby, when both X and Y are reacted with polymerizable groups to produce polymerizable mesogens, R$^2$ provides sufficient steric hindrance to achieve a nematic state at room temperature while suppressing crystallinity of said polymerizable mesogens at room temperature; and, $R^1$ and $R^3$ are selected from groups less bulky than $R^2$; and reacting one or more member selected from the group consisting of X and Y with a moiety comprising a polymerizable group under third conditions effective to produce said blend.

26. The method of claim 25 wherein one member selected from the group consisting of X and Y comprises a polymerizable group in about 50 wt % or more of said blend, said blend having a $T_c$ from about 20° C. to about 37° C. and a ΔT of about 10° C.

27. The method of claim 26 wherein the second conditions comprise a quantity of nucleophile and an amount of Lewis acid effective to cleave at least one of said first alkyl ether group and said second alkyl ether group.

28. The method of claim 27 wherein said quantity of nucleophile and said amount of Lewis acid also are effective to precipitate said platform molecules from said reaction product.

29. The method of claim 27 wherein:
said nucleophile is thiol and said quantity of nucleophile is about 1 mole of thiol or more per mole of alkyl ether; said Lewis acid is aluminum chloride at a ratio of about 4:1 to said alkyl ether.

30. The method of claim 28 wherein:
said nucleophile is thiol and said quantity of nucleophile is about 1 mole of thiol or more per mole of alkyl ether; said Lewis acid is aluminum chloride at a ratio of about 4:1 to said alkyl ether.

31. The method of claim 30 wherein said second conditions further comprise a molar excess of halogenated solvent in relation to the quantity of thiol, the molar excess being sufficiently high to maintain precipitated platform molecules in slurry form.

32. The method of claim 31 wherein said molar excess is from about 3 to about 7 molar excess in relation to the quantity of thiol.

33. The method of claim 32 wherein said molar excess is about 5 or more in relation to the quantity of thiol.

34. The method of claim 33 wherein the halogenated solvent is dichloromethane.

35. The method of claim 26 wherein one member selected from the group consisting of X and Y comprises a polymerizable group in about 60 wt. % or more of said blend.

36. The method of claim 26 wherein one member selected from the group consisting of X and Y comprises a polymerizable group in about 70 wt. % or more of said blend.

37. The method of claim 31 wherein one member selected from the group consisting of X and Y comprises a polymerizable group in about 60 wt. % or more of said blend.

38. The method of claim 34 wherein one member selected from the group consisting of X and Y comprises a polymerizable group in about 70 wt. % or more of said blend.

39. The method of claim 26 wherein said moiety comprises polymerizable groups selected from the group consisting of acryloyl groups, methacryloyl groups, and cinnamoyl groups.

40. The method of claim 31 wherein said moiety comprises polymerizable groups selected from the group consisting of acryloyl groups, methacryloyl groups, and cinnamoyl groups.

41. The method of claim 26 comprising producing said blend having a ΔT of about 20° C. or more.

42. The method of claim 26 comprising producing said blend having a ΔT of about 30° C. or more.

43. The method of claim 31 comprising producing said blend having a ΔT of about 20° C. or more.

44. The method of claim 31 comprising producing said blend having a ΔT of about 30° C. or more.

* * * * *

UNITED STATES PATENT AND TRADEMARK OFFICE
CERTIFICATE OF CORRECTION

PATENT NO. : 7,108,801 B2 Page 1 of 1
APPLICATION NO. : 10/057506
DATED : September 19, 2006
INVENTOR(S) : Stephen T. Wellinghoff and Douglas P. Hanson It is certified that error appears in the above-identified patent and that said Letters Patent is hereby corrected as shown below:

In column 1, lines 14-15, delete the sentence: "The U.S. government has certain rights in this invention pursuant to grant number NIDCR 1 P01 DE11688." and insert the sentence: -- This invention was made with government support under NIDCR 1 P01 DE 11688 awarded by the National Institutes of Health (NIH). The government has certain rights in the invention. --

In column 31, line 13, in Claim 12, delete "substantially" and insert -- substituted --;

In column 31, line 40, in Claim 12, insert -- group -- after "polymerizable";

In column 31, line 56, in Claim 16, delete "claim 12" and insert -- claim 13 --;

In column 33, line 10, in Claim 26, add -- of -- after Tc;

In column 33, line 11, in Claim 26, add -- or more -- after 10° C; and

In column 34, line 16, in Claim 38, delete "claim 34" and insert -- claim 31 --.

Signed and Sealed this

Twenty-fifth Day of March, 2008

JON W. DUDAS
*Director of the United States Patent and Trademark Office*